United States Patent
Koga et al.

(10) Patent No.: US 6,717,326 B2
(45) Date of Patent: Apr. 6, 2004

(54) ELECTROSTATIC ACTUATOR AND CAMERA MODULE USING THE SAME

(75) Inventors: Akihiro Koga, Kawasaki (JP);
Mitsunobu Yoshida, Kawasaki (JP);
Shunsuke Hattori, Kawasaki (JP);
Akihiro Kasahara, Sambu-gun (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 10/447,111

(22) Filed: May 29, 2003

(65) Prior Publication Data

US 2003/0189390 A1 Oct. 9, 2003

Related U.S. Application Data

(62) Division of application No. 09/984,686, filed on Oct. 31, 2001, now Pat. No. 6,611,079.

(30) Foreign Application Priority Data

Oct. 31, 2000 (JP) ....................................... 2000-333582

(51) Int. Cl.$^7$ ................................................ H02N 1/00
(52) U.S. Cl. ........................ 310/309; 348/374; 396/75; 318/116
(58) Field of Search ..................... 310/309.12; 348/374; 359/823; 396/75, 133

(56) References Cited

U.S. PATENT DOCUMENTS

| | | | |
|---|---|---|---|
| 5,235,225 A | 8/1993 | Colgate et al. | 310/12 |
| 5,523,639 A | 6/1996 | Okamoto et al. | 310/309 |
| 2001/0028203 A1 | 10/2001 | Ksahara et al. | 310/309 |
| 2002/0036443 A1 | 3/2002 | Akiba et al. | 310/309 |
| 2002/0037171 A1 | 3/2002 | Kasahara | 396/661 |
| 2002/0050764 A1 | 5/2002 | Koga et al. | 310/309 |
| 2002/0074896 A1 | 6/2002 | Kasahara et al. | 310/309 |
| 2002/0106204 A1 | 8/2002 | Miyamaru | 396/89 |

FOREIGN PATENT DOCUMENTS

| | | | |
|---|---|---|---|
| EP | 0 381 212 A | 8/1990 | |
| JP | 09-033361 | 2/1996 | |
| JP | 8-140367 | 5/1996 | |
| JP | 09-163761 | 6/1997 | |
| JP | 09-266684 | 10/1997 | |
| JP | 10-239578 | 9/1998 | |
| JP | 10-239740 | 9/1998 | |
| JP | 11-004803 | 1/1999 | |
| JP | 11-281870 | 10/1999 | |

OTHER PUBLICATIONS

A. Koga, et al., Journal of Lightwave Technology, vol. 17, No. 1, pp. 43–47, "Electrostatic Linear Microactuator Mechanism for Focusing a CCD Camera," Jan. 1999.

"Attachment/Detachment Electrostatic Micro Actuators for Pan–tilt Drive for a Mircro CCD Camera," Koga et al. Jan. 1996.

"Electrostatic Linear Micro Actuators with Vibration Motion for Pan–Tilt Drive of a Micro CCD Camera," Koga et al., Jan. 1996.

Patent Abstracts of Japan vol. 1996, No. 09, Sep. 30, 1996 & JP 08 140367 A (Toshiba Corp.), May 31, 1996.

Patent Abstracts of Japan vol. 1998, No. 14, Dec. 31, 1998 & JP 10 239578 A (Toshiba Corp.), Sep. 11, 1998.

*Primary Examiner*—Karl Tamai
(74) *Attorney, Agent, or Firm*—Oblon, Spivak, McClelland, Maier & Neustadt, P.C.

(57) ABSTRACT

An electrostatic actuator comprises first and second stator sections having a first electrode array arranged in a first direction, and a second electrode array of electrodes extending in the first direction, respectively. A movable section having fifth and sixth electrodes arranged to face the first and second electrode arrays, respectively, is arranged between the first and second stator sections. A driving circuit alternately performs a first driving operation in which a DC voltage is applied between the adjacent electrodes of the first electrode array and a second driving operation in which a DC voltage is applied between the electrodes of the second electrode array. The voltage application is successively performed by deviating the positions of the electrodes to which the voltage is applied so as to move the movable section in the first direction while vibrating the movable section between the first and second stator sections.

16 Claims, 17 Drawing Sheets

ELECTROSTATIC ACTUATOR AND CAMERA MODULE USING THE SAME

CROSS-REFERENCE TO RELATED APPLICATIONS

This application is based upon and claims the benefit of priority from the prior Japanese Patent Application No. 2000-333582, filed Oct. 31, 2000, the entire contents of which are incorporated herein by reference.

BACKGROUND OF THE INVENTION

1. Field of the Invention

The present invention relates to an electrostatic actuator for driving a movable section arranged between a pair of stator sections by utilizing an electrostatic force (Coulomb force), particularly, to an electrostatic actuator that makes it unnecessary to use an electric wiring connected to the movable section and a camera module using the particular electrostatic actuator in the focus adjusting mechanism.

2. Description of the Related Art

An electrostatic actuator comprising a movable section arranged between a pair of stator sections, said movable section being driven by an electrostatic force (Coulomb force), is disclosed in, for example, Japanese Patent Disclosure (Kokai) No. 8-140367. The conventional electrostatic actuator disclosed in this prior art comprises a first stator section and a second stator section, which are arranged to face each other, and a movable section arranged between these first and second stator sections. A first electrode array consisting of a plurality of electrodes arranged at a predetermined pitch in the longitudinal direction is mounted to the first stator section. Also, a second electrode array consisting of a plurality of electrodes arranged at a predetermined pitch in the longitudinal direction is mounted to the second stator section. It should be noted, however, that the phase of the electrodes of the first electrode array is deviated from the phase of the electrodes of the second electrode array by a ½ pitch.

To be more specific, the electrodes of each of the first electrode array and the second electrode array are divided on the imaginary basis into four groups A, B, C and D, with every two electrodes in the arranging direction forming a single group, and a DC voltage is applied between the electrodes of each of these groups and the electrodes on the movable section.

In the conventional electrostatic actuator disclosed in this prior art, the driving operations (1) and (2) given below are alternately repeated:

(1) A DC voltage is applied between the first electrode array and the electrode mounted to the movable section so as to attract electrostatically the movable section toward the first stator section; and (2) A DC voltage is applied between the second electrode array and the electrode mounted to the movable section so as to attract electrostatically the movable section toward the second stator section.

By the driving operation given above, the movable section is macroscopically moved successively in the longitudinal direction of the stator sections by ½ pitch of the electrode array while being vibrated microscopically between the first stator section and the second stator section. The moving direction of the movable section can be changed by changing the order of applying a DV voltage to the electrodes of groups A, B, C and D. Specifically, the movable section can be moved in a first direction by applying a DC voltage to the electrodes of groups A and B, the electrodes of groups B and C, the electrodes of groups C and D, and the electrodes of group D in the order mentioned. Also, the movable section can be moved in a second direction opposite to said first direction by applying a DC voltage to the electrodes of groups D and C, the electrodes of groups C and B, the electrodes of groups B and A, and the electrodes of group A in the order mentioned.

In the conventional electrostatic actuator, utilized is the electrostatic force generated when a DC voltage is applied between the electrode arrays on the stator sections and the electrode on the movable section so as to make it absolutely necessary to mount an electrical wiring to not only the electrode arrays on the stator sections but also to the electrode on the movable section. Since it is necessary to mount an electrical wiring to the movable section, the mass production capability of the electrostatic actuator is impaired. Also, since the space for the wiring is required, the miniaturization of the electrostatic actuator is impaired. Further, since the movable section is moved frequently, stress is applied to the wiring to the electrode on the movable section, with the result that the reliability is lowered during use of the electrostatic actuator over a long time.

It should also be noted that, in the conventional electrostatic actuator, a dielectric film is formed on the electrode as a measure against the insulation breakdown. What should be noted is that the dielectric polarization is generated in the dielectric film when a DC voltage is applied between the electrode arrays on the stator sections and the electrode on the movable section. The dielectric polarization produces the force for keeping the movable section, which is attracted to one of the stator sections, attracted to the particular stator section. The potential difference produced by the dielectric polarization is small. However, since the distance between the movable section and the stator section is small, it is possible for the force produced by the dielectric polarization to become larger than the electrostatic force produced between the electrode on the other stator section and the electrode on the movable section, with the result that the normal moving operation of the movable section tends to be obstructed.

As described above, in the conventional electrostatic actuator, in which the movable section is moved by utilizing the electrostatic force generated when a DC voltage is applied between the electrode array on the stator section and the electrode on the movable section, it is absolutely necessary to mount an electrical wiring to the electrode on the movable section so as to give rise to the problems that the mass production capability of the electrostatic actuator is lowered, that the electrostatic actuator is rendered bulky because of the requirement of the space occupied by the electrical wiring, and that the reliability of the electrostatic actuator is lowered over a long time.

In addition, the conventional electrostatic actuator gives rise to the problem that the moving operation of the movable section is rendered unstable under the influence of the dielectric polarization taking place in the dielectric film formed on the electrode as a measure against the insulation breakdown.

BRIEF SUMMARY OF THE INVENTION

An object of the present invention is to provide an electrostatic actuator that makes it unnecessary to mount an electrical wiring to the movable section.

Another object of the present invention is to provide an electrostatic actuator that permits eliminating the influence given by the dielectric polarization of the dielectric film formed on the electrode so as to realize a stable operation.

Further, still another object of the present invention is to provide a camera module using the particular electrostatic actuator of the present invention in the focus adjusting mechanism.

According to a first aspect of the present invention, there is provided an electrostatic actuator, comprising:

- a first stator section including a first electrode array including first, second and third electrodes arranged at a predetermined pitch in a first direction;
- a second stator section arranged to face the first stator section and to define a space between the first and second stator sections, and including a second electrode array including fourth and fifth electrodes extending in the first direction;
- a movable section arranged in the space and including a first electrode section facing the first electrode array and a second electrode section facing the second electrode array, the first and second electrode sections being maintained at a predetermined floating potential; and
- a driving circuit configured to apply DC voltage signals to the first and second electrode arrays, alternatively, the DC voltage signal having a first level higher than the predetermined floating potential and a second level lower than the predetermined floating potential,
- the first DC voltage signal being applied to the adjacent first and second electrodes of the first electrode array to attract the first electrode section of the movable section during a first period, the first and second electrodes of the first electrode array being maintained at the first and second levels during the first period, respectively,
- the second DC voltage signal being applied to the fourth and fifth electrodes of the second electrode array to attract the second electrode section of the movable section during a second period, the fourth and fifth electrodes of the second electrode array being maintained at the first and second levels during the second period, respectively,
- the third DC voltage signal being applied to the adjacent second and third electrodes of the first electrode array to attract the first electrode section of the movable section during a third period, the second and third electrodes of the first electrode array being maintained at the first and second levels during the third period, respectively,
- the fourth DC voltage signal being applied to the fourth and fifth electrodes of the second electrode array to attract the second electrode section of the movable section during a fourth period, the fourth electrode of the second electrode array being maintained at one of the first and second levels during the fourth period, and the fifth electrode of the second electrode array being maintained at the other of first and second levels during the fourth period, and
- the movable section being moved in the first direction in accordance with the application of the first, second, third and fourth DC voltage signals.

According to a second aspect of the present invention, there is provided an electrostatic actuator, comprising:

- a first stator section including a first electrode array including first, second and third electrodes arranged at a predetermined pitch in a first direction;
- a second stator section arranged to face the first stator section and to define a space between the first and second stator sections, and including a second electrode array including fourth, fifth and sixth electrodes arranged at the predetermined pitch in the first direction;
- a movable section arranged in the space and including a first electrode section facing the first electrode array and a second electrode section facing the second electrode array, the first and second electrode sections being maintained at a predetermined floating potential; and
- a driving circuit configured to apply DC voltage signals to the first and second electrode arrays, alternatively, the DC voltage signal having a first level higher than the predetermined floating potential and a second level lower than the predetermined floating potential,
- the first DC voltage signal being applied to the adjacent first and second electrodes of the first electrode array to attract the first electrode section of the movable section during a first period, the first and second electrodes of the first electrode array being maintained at the first and second levels during the first period, respectively,
- the second DC voltage signal being applied to the adjacent fourth and fifth electrodes of the second electrode array to attract the second electrode section of the movable section during a second period, the fourth and fifth electrodes of the second electrode array being maintained at the first and second levels during the second period, respectively,
- the third DC voltage signal being applied to the adjacent second and third electrodes of the first electrode array to attract the first electrode section of the movable section during a third period, the second and third electrodes of the first electrode array being maintained at the first and second levels during the third period, respectively,
- the fourth DC voltage signal being applied to the adjacent fifth and sixth electrodes of the second electrode array to attract the second electrode section of the movable section during a fourth period, the fifth and sixth electrodes of the second electrode array being maintained at the first and second levels during the fourth period, respectively, and
- the movable section being moved in the first direction in accordance with the application of the first, second, third and fourth DC voltage signals.

According to a third aspect of the present invention, there is provided an electrostatic actuator, comprising:

- a first stator section including first and second electrode arrays each including first, second and third electrodes and arranged substantially in parallel and at a predetermined pitch in a first direction;
- a second stator section arranged to face the first stator section and to define a space between the first and second stator sections, and including a third electrode array including fourth and fifth electrodes;
- a movable section arranged in the space and including a first electrode section facing the first electrode array and a second electrode section facing the second electrode array, the first and second electrode sections being maintained at a predetermined floating potential; and
- a driving circuit configured to apply DC voltage signals to the first and second electrode arrays and the third electrode array, alternatively, the DC voltage signal having a first level higher than the predetermined floating potential and a second level lower than the predetermined floating potential,
- the first DC voltage signal being applied to the first electrodes of the first and second electrode arrays to attract the first electrode section of the movable section during a first period, the first electrodes of the first and second electrode arrays being maintained at the first and second levels during the first period, respectively, the second DC voltage signal being applied to the fourth and fifth electrodes of the third electrode array to attract the second electrode section of the movable section during a second period, the third DC voltage signal being applied to the second electrodes of the first and second electrode arrays to attract the first electrode section of the movable section during a third period, the second electrodes of the first and second electrode arrays being maintained at the first and second levels during the third period, respectively, and the movable section being moved in the first direction in accordance with the application of the first, second and third DC voltage signals.

According to a fourth aspect of the present invention, there is provided an electrostatic actuator, comprising:

a first stator section including first and second electrode arrays each including first and second electrodes and arranged substantially in parallel and at a predetermined pitch in a first direction;

a second stator section arranged to face the first stator section and to define a space between the first and second stator sections, and including third and fourth electrode arrays each including third and fourth electrodes and arranged substantially in parallel and at a predetermined pitch in the first direction, the third and fourth electrode array being arranged at the same pitch as that of the first and second electrode arrays in the first direction and the arrangement of the third and fourth electrode arrays being deviated by the half of the predetermined pitch from the arrangement of the first and second electrode arrays;

a movable section arranged in the space and including a first electrode section facing the first and second electrode arrays and a second electrode section facing the third and fourth electrode arrays, the first and second electrode sections being maintained at a predetermined floating potential; and a driving circuit configured to apply DC voltage signals to the first, second, third and fourth electrode arrays, alternatively, the DC voltage signal having a first level higher than the predetermined floating potential and a second level lower than the predetermined floating potential, the first DC voltage being applied to the first electrodes of the first and second electrode arrays to attract the first electrode section of the movable section during a first period, the first electrodes of the first and second electrode arrays being maintained at the first and second levels during the first period, respectively, the second DC voltage being applied to the third electrodes of the third and fourth electrode arrays to attract the second electrode section of the movable section during a second period, the third electrodes of the third and fourth electrode arrays being maintained at the first and second levels during the second period, respectively, the third DC voltage being applied to the second electrodes of the first and second electrode arrays to attract the first electrode section of the movable section during a third period, the second electrodes of the first and second electrode arrays being maintained at the first and second levels during the third period, respectively, the fourth DC voltage being applied to the fourth electrodes of the third and fourth electrode arrays to attract the second electrode section of the movable section during a fourth period, the fourth electrodes of the third and fourth electrode arrays being maintained at the first and second levels during the third period, respectively, and the movable section being moved in the first direction in accordance with the application of the first, second, third and fourth DC voltage signals.

According to a fifth aspect of the present invention, there is provided an electrostatic actuator, comprising:

a first stator section including first, second and third electrode arrays each including first and second electrodes and arranged substantially in parallel and at a predetermined pitch in a first direction;

a second stator section arranged to face the first stator section and to define a space between the first and second stator sections, and including a fourth electrode array including fourth and fifth electrodes;

a movable section arranged in the space and including a first electrode section facing the first, second and third electrode arrays and a second electrode section facing the fourth and fifth electrode arrays, the first and second electrode sections being maintained at a predetermined floating potential; and a driving circuit configured to apply DC voltage signals to the first, second, third and fourth electrode arrays, alternatively, the DC voltage signal having a first level higher than the predetermined floating potential and a second level lower than the predetermined floating potential, the first DC voltage signal being applied to the first electrodes of the first, second and third electrode arrays to attract the first electrode section of the movable section during a first period, the first electrodes of the first and third electrode arrays being maintained at one of the first and second levels during the first period and the first electrode of the second electrode array being maintained at the other of the first and second levels during the first period, the second DC voltage signal being applied to the third and fourth electrodes of the fourth electrode array to attract the second electrode section of the movable section during a second period, the third DC voltage signal being applied to the second electrodes of the first, second and third electrode arrays to attract the first electrode section of the movable section during a third period, the second electrodes of the first and third electrode arrays being maintained at one of the first and second levels during the third period, the second electrodes of the second electrode array being maintained at the other of the first and second levels during the third period, and the movable section being moved in the first direction in accordance with the application of the first, second and third DC voltage signals.

According to a sixth aspect of the present invention, there is provided a camera module for photographing a picture image, comprising:

an electrostatic actuator, including:

a first stator section including a first electrode array including first, second and third electrodes arranged at a predetermined pitch in a first direction;

a second stator section arranged to face the first stator section and to define a space between the first and second stator sections, and including a second electrode array including fourth and fifth electrodes extending in the first direction;

a movable section arranged in the space and including a first electrode section facing the first electrode array and a second electrode section facing the second electrode array, the first and second electrode sections being maintained at a predetermined floating potential; and a driving circuit configured to apply DC voltage signals to the first and second electrode arrays, alternatively, the DC voltage signal having a first level higher than the predetermined floating potential and a second level lower than the predetermined floating potential, the first DC voltage signal being applied to the adjacent first and second electrodes of the first electrode array to attract the first electrode section of the movable section during a first period, the first and second electrodes of the first electrode array being maintained at the first and second levels during the first period, respectively, the second DC voltage signal being applied to the fourth and fifth electrodes of the second electrode array to attract the second electrode section of the movable section during a second period, the fourth and fifth electrodes of the second electrode array being maintained at the first and second levels during the second period, respectively, the third DC voltage signal being applied to the adjacent second and third electrodes of the first electrode array to attract the first electrode section of the movable section during a third period, the second and third electrodes of the first electrode array being maintained at the first and second levels during the third period, respectively, the fourth DC voltage signal being applied to the fourth and fifth electrodes of the second electrode array to attract the second electrode section of the movable section during a fourth period, the fourth electrode of the second electrode array being maintained at one of the first and second levels during the fourth period, and the fifth electrode of the second electrode array being maintained at the other of first and second levels during the fourth period, and the movable section being moved in the first direction in accordance with the application of the first, second, third and fourth DC voltage signals;

a lens mounted in the movable section and movable with the movable section, configured to transfer the picture image; and an image pick-up element configured to receive the transferred picture image to generate a image signal.

According to a seventh aspect of the present invention, there is provided a camera module for photographing a picture image, comprising:

an electrostatic actuator, including:

a first stator section including a first electrode array including first, second and third electrodes arranged at a predetermined pitch in a first direction;

a second stator section arranged to face the first stator section and to define a space between the first and second stator sections, and including a second electrode array including fourth, fifth and sixth electrodes arranged at the predetermined pitch in the first direction;

a movable section arranged in the space and including a first electrode section facing the first electrode array and a second electrode section facing the second electrode array, the first and second electrode sections being maintained at a predetermined floating potential; and a driving circuit configured to apply DC voltage signals to the first and second electrode arrays, alternatively, the DC voltage signal having a first level higher than the predetermined floating potential and a second level lower than the predetermined floating potential, the first DC voltage signal being applied to the adjacent first and second electrodes of the first electrode array to attract the first electrode section of the movable section during a first period, the first and second electrodes of the first electrode array being maintained at the first and second levels during the first period, respectively, the second DC voltage signal being applied to the adjacent fourth and fifth electrodes of the second electrode array to attract the second electrode section of the movable section during a second period, the fourth and fifth electrodes of the second electrode array being maintained at the first and second levels during the second period, respectively, the third DC voltage signal being applied to the adjacent second and third electrodes of the first electrode array to attract the first electrode section of the movable section during a third period, the second and third electrodes of the first electrode array being maintained at the first and second levels during the third period, respectively, the fourth DC voltage signal being applied to the adjacent fifth and sixth electrodes of the second electrode array to attract the second electrode section of the movable section during a fourth period, the fifth and sixth electrodes of the second electrode array being maintained at the first and second levels during the fourth period, respectively, and the movable section being moved in the first direction in accordance with the application of the first, second, third and fourth DC voltage signals;

a lens mounted in the movable section and movable with the movable section, configured to transfer the picture image; and an image pick-up element configured to receive the transferred picture image to generate a image signal.

According to a eighth aspect of the present invention, there is provided a camera module for photographing a picture image, comprising:

an electrostatic actuator, including:

a first stator section including first and second electrode arrays each including first and second electrodes and arranged substantially in parallel and at a predetermined pitch in a first direction;

a second stator section arranged to face the first stator section and to define a space between the first and second stator sections, and including third and fourth electrode arrays each including third and fourth electrodes and arranged substantially in parallel and at a predetermined pitch in the first direction, the third and fourth electrode array being arranged at the same pitch as that of the first and second electrode arrays in the first direction and the arrangement of the third and fourth electrode arrays being deviated by the half of the predetermined pitch from the arrangement of the first and second electrode arrays;

a movable section arranged in the space and including a first electrode section facing the first and second electrode arrays and a second electrode section facing the third and fourth electrode arrays, the first and second electrode sections being maintained at a predetermined floating potential; and a driving circuit configured to apply DC voltage signals to the first, second, third and fourth electrode arrays, alternatively, the DC voltage signal having a first level higher than the predetermined floating potential and a second level lower than the predetermined floating potential, the first DC voltage being applied to the first electrodes of the first and second electrode arrays to attract the first electrode section of the movable section during a first period, the first electrodes of the first and second electrode arrays being maintained at the first and second levels during the first period, respectively, the second DC voltage being applied to the third electrodes of the third and fourth electrode arrays to attract the second electrode section of the movable section during a second period, the third electrodes of the third and fourth electrode arrays being maintained at the first and second levels during the second period, respectively, the third DC voltage being applied to the second electrodes of the first and second electrode arrays to attract the first electrode section of the movable section during a third period, the second electrodes of the first and second electrode arrays being maintained at the first and second levels during the third period, respectively, the fourth DC voltage being applied to the fourth electrodes of the third and fourth electrode arrays to attract the second electrode section of the movable section during a fourth period, the fourth electrodes of the third and fourth electrode arrays being maintained at the third and fourth levels during the fourth period, respectively, and the movable section being moved in the first direction in accordance with the application of the first, second, third and fourth DC voltage signals;

a lens mounted in the movable section and movable with the movable section, configured to transfer the picture image; and an image pick-up element configured to receive the transferred picture image to generate a image signal.

According to a ninth aspect of the present invention, there is provided a camera module for photographing a picture image, comprising:

an electrostatic actuator, including:

a first stator section including first, second and third electrode arrays each including first and second electrodes and arranged substantially in parallel and at a predetermined pitch in a first direction;

a second stator section arranged to face the first stator section and to define a space between the first and second stator sections, and including a fourth electrode array including fourth and fifth electrodes;

a movable section arranged in the space and including a first electrode section facing the first, second and third electrode arrays and a second electrode section facing the fourth electrode array, the first and second electrode sections being maintained at a predetermined floating potential; and a driving circuit configured to apply DC voltage signals to the first, second, third and fourth electrode arrays, alternatively, the DC voltage signal having a first level higher than the predetermined floating potential and a second level lower than the predetermined floating potential, the first DC voltage signal being applied to the first and second electrodes of the first, second and third electrode arrays to attract the first electrode section of the movable section during a first period, the first and second electrodes of the first and third electrode arrays being maintained at one of the first and second levels during the first period and the first and second electrodes of the second electrode array being maintained at the other of the first and second levels during the first period, the second DC voltage signal being applied to the third and fourth electrodes of the fourth electrode array to attract the second electrode section of the movable section during a second period, the third DC voltage signal being applied to the second and third electrodes of the first, second and third electrode arrays to attract the first electrode section of the movable section during a third period, the second and third electrodes of the first and third electrode arrays being maintained at one of the first and second levels during the third period, the second electrodes of the second electrode array being maintained at the other of the first and second levels during the third period, and the movable section being moved in the first direction in accordance with the application of the first, second and third DC voltage signals;

a lens mounted in the movable section and movable with the movable section, configured to transfer the picture image; and an image pick-up element configured to receive the transferred picture image to generate a image signal.

DETAILED DESCRIPTION OF THE INVENTION

Some embodiments of the present invention will now be described with reference to the accompanying drawings.

(First Embodiment)

Figure 1A:
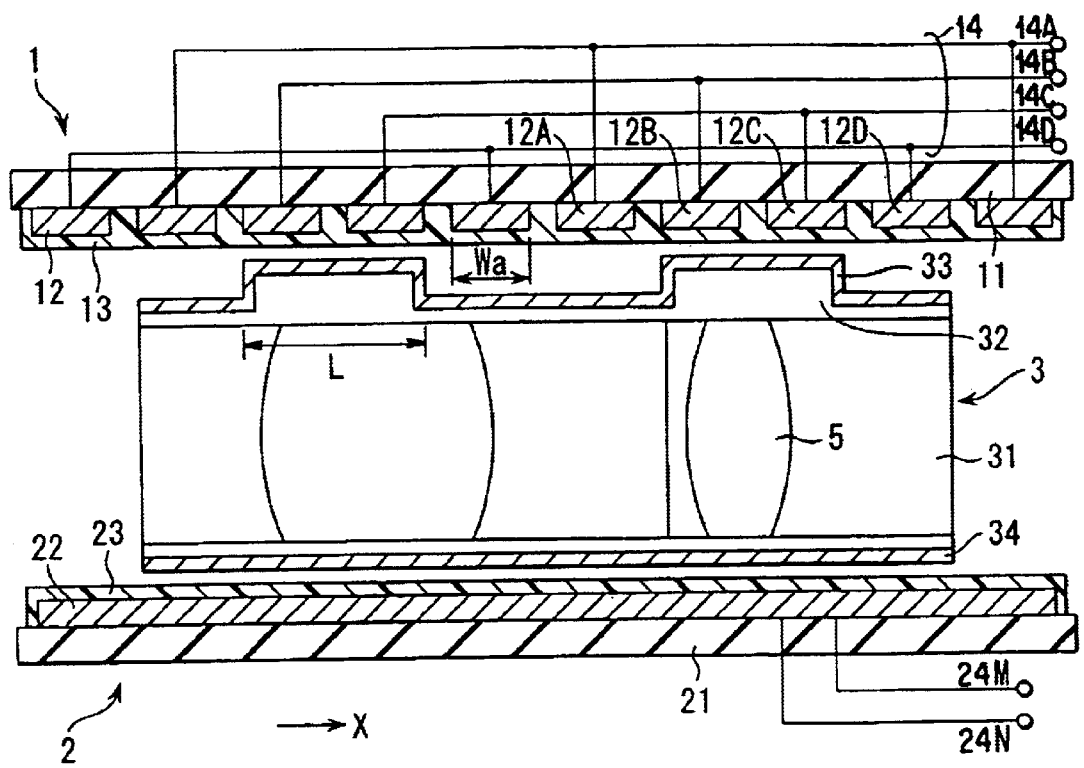
FIGS. 1A and 1B are cross sectional views schematically showing the construction of the electrostatic actuator according to a first embodiment of the present invention in a longitudinal direction of the electrostatic actuator and in a direction perpendicular to the longitudinal direction, respectively.
Figure 1B:
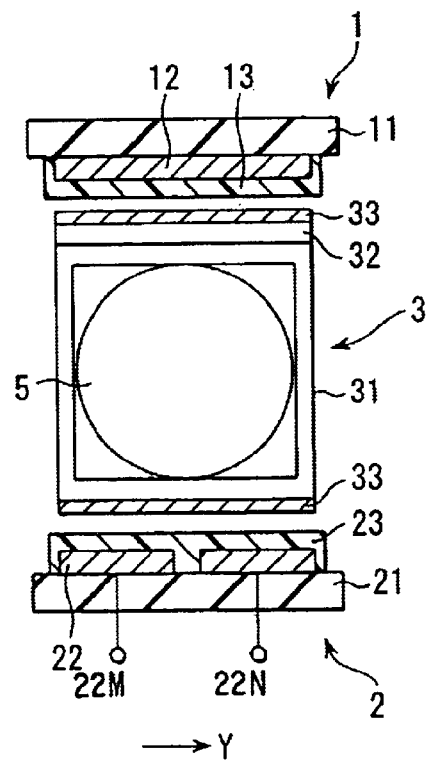
Figure 2:
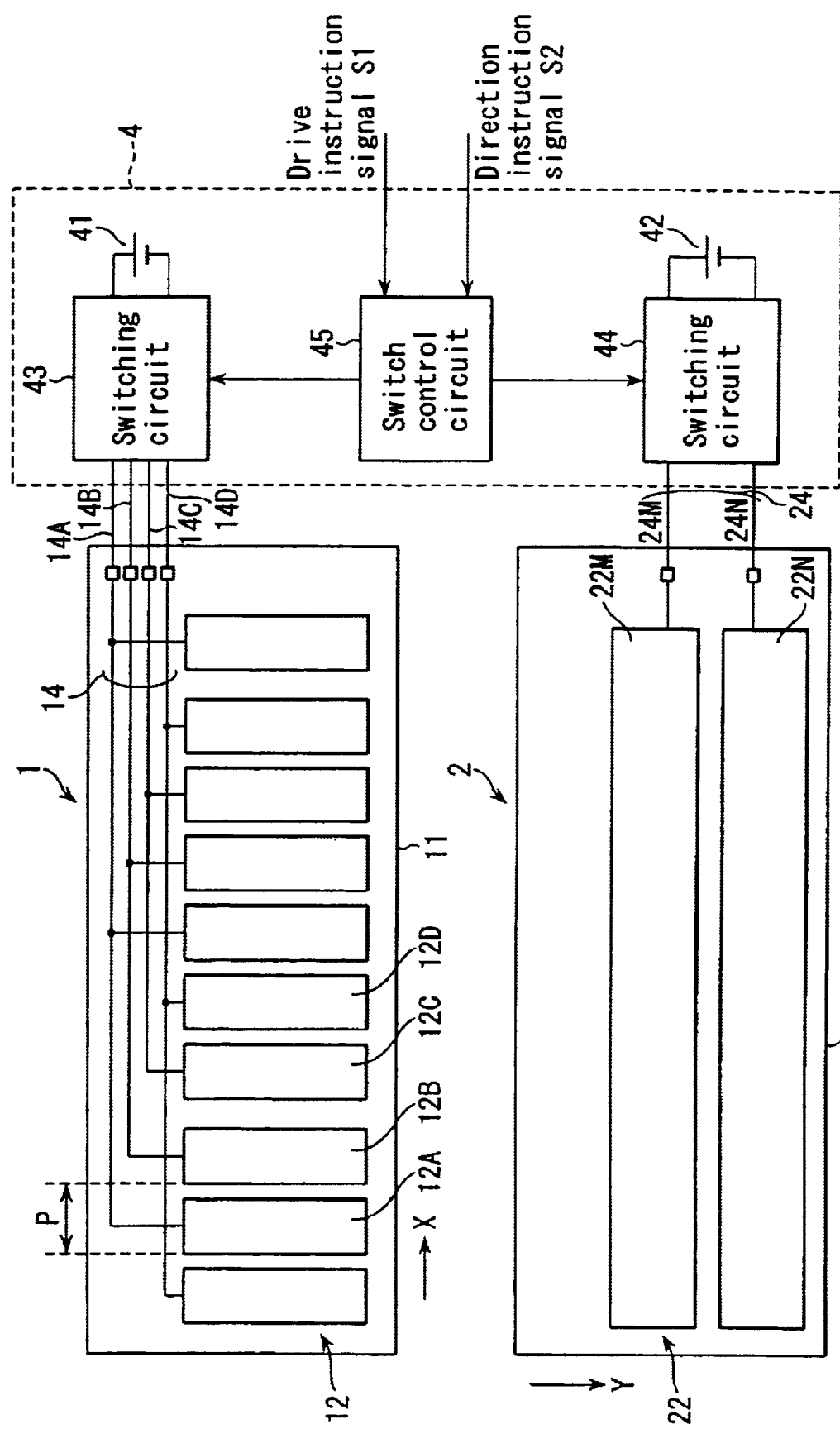
FIG. 2 schematically shows the constructions of the first electrode array and the second electrode array on the first stator section and the second stator section shown in FIGS. 1A and 1B, respectively, as well as the construction of the driving circuit.

FIGS. 1A and 1B collectively show the construction of an electrostatic actuator according to a first embodiment of the present invention; wherein FIG. 1A is a cross sectional view showing the electrostatic actuator in the longitudinal direction (X-direction), and FIG. 1B is a cross section showing the electrostatic actuator in a direction (Y-direction) perpendicular to the longitudinal direction. FIG. 2 shows the planar shapes of the electrode arrays on the first stator section and the second stator section as well as the inner structure of the driving circuit. The electrostatic actuator comprises a first stator section 1 and a second stator section 2 arranged to face each other, a movable section 3 arranged in a space between the first stator section 1 and the second stator section 2 and movable in the Y-direction, and a driving circuit 4.

The first stator section 1 includes an insulating substrate 11, a first electrode array 12 formed on the substrate 11, and a dielectric film 13 formed to cover the first electrode array 12. As shown in FIG. 2, the first electrode array 12 includes a large number of strip-like electrodes arranged at a predetermined pitch P in the longitudinal direction of the substrate 11, i.e., the first direction or the X-direction. In the first electrode array 12, the electrode groups each consisting of the first, second, third and fourth electrodes are arranged in the electrode arranging direction (X-direction) at the same period and at the same interval. For the sake of the brevity, the first, second, third and fourth electrodes are called the electrodes 12A, 12B, 12C and 12D, and the capital letters A, B, C, D are put in the drawing to the wirings to these first to fourth electrodes, respectively, so as to clarify the connecting relationship.

As apparent from FIG. 1A, the first electrodes 12A are commonly connected by a wiring 14A so as to be connected to the driving circuit 4. Similarly, the second electrodes 12B are commonly connected by the wiring 14B so as to be connected to the driving circuit 4, and the third electrodes 12C are commonly connected by the wiring 14C so as to be connected to the driving circuit 4. Further, the fourth electrodes 12D are commonly connected by the wiring 14D so as to be connected to the driving circuit 4. The wiring 14 is of a two layer structure having an insulating layer interposed between the upper and lower conductive layers. In other words, the wiring 14 is of a steric wiring structure constructed such that one end of each of the upper and lower conductive layers is connected to the driving circuit 4.

The second stator section 2 includes an insulating substrate 21, a second electrode array 22 formed on the insulating substrate 21, and a dielectric film 23 formed to cover the upper surface of the second electrode array 22. As shown in FIG. 2, the second electrode array 22 includes two band-like electrodes 22M and 22N formed to extend in the longitudinal direction of the substrate 21 (first direction or the X-direction) apart from each other in the second direction (Y-direction) perpendicular to the X-direction. These electrodes 22M and 22N are connected to the driving circuit 4.

As described above, the dielectric films 13 and 23 are formed on the first stator section 1 and the second stator section 2, respectively. The dielectric film 13 serves to insulate the electrodes of the first electrode array 12 from each other and to insulate the electrodes of the first electrode array 12 from a fifth electrode 33 on the movable section 3. Similarly, the dielectric film 23 serves to insulate the electrodes of the second electrode array 22 from each other and to insulate each electrode of the second electrode array 22 from a sixth electrode 34 on the movable section 3.

In general, where a dielectric film is formed to cover the electrodes included in the electrostatic actuator, the moving operation of the movable section is rendered unstable under the influence of the dielectric polarization of the dielectric film. In the electrostatic actuator according to the first embodiment of the present invention, however, the voltage application pattern to the electrodes is improved so as to overcome the problem pointed out above as described in detail herein later.

The movable section 3 is formed of a hollow parallelepiped insulating substrate 31. The insulating substrate 31 includes a convex portion 32 on the side facing the first electrode array 12 on the first stator section 1. The fifth electrode 33 is mounted to the surface of the convex portion 32 facing the first electrode array 12, and the sixth electrode 34 is mounted to the surface of the convex portion 32 facing the second electrode array 22 on the second stator section 2. The movable section 3 is arranged movable in the right-left direction (X-direction) in the moving space between the first stator section 1 and the second stator section 2. As shown in FIG. 1A, the size of the electrode surface (width L) of the convex portion 32 in the moving direction (X-direction) of the movable section 3 is set at about 1.5 to 2.0 times as much as the size (width Wa) of each of the electrodes 12A, 12B, 12C and 12D in the X-direction. On the other hand, the fifth electrode 33 and the sixth electrode 34 are not connected to the driving circuit 4 and are in an electrically floating state so as to form so-called "floating electrodes".

As shown in FIG. 2, the driving circuit 4 includes two DC voltage sources 41, 42, two switching circuits 43, 44 serving to switch the DC voltage signals generated from the DC voltage sources 41, 42 so as to generate rectangular wave form voltage signals, and a switch control circuit 45 serving to control the outputs of the rectangular wave form voltage signals generated from the switching circuits 43, 44. The switching circuit 43 serving to connect the first electrode array 12 to the DC voltage source 41 via the wiring 14 includes an input terminal and an output terminal. The output generated from the output terminal is controlled by a control signal generated from the switch control circuit 45 and supplied to the input terminal. Likewise, the switching circuit 44 serving to connect the second electrode array 22 to the DC voltage source 42 includes an input terminal and an output terminal. The output generated from the output terminal is controlled by a control signal generated from the switch control circuit and supplied to the input terminal. The switch control circuit 45 is constructed to control the switching circuits 43, 44 in accordance with a drive instruction signal S1 and a direction instruction signal S2 generated from, for example, a host computer (not shown).

The operation of the electrostatic actuator according to the first embodiment of the present invention will now be described with reference to the time charts shown in FIGS. 3A to 3F and to the operating states shown in FIGS. 4 to 7. FIGS. 3A to 3F show the wave forms of the voltages applied to the electrodes 12A, 12B, 12C, 12D, 22M and 22N, and FIGS. 4 to 7 show how the movable section 3 is moved.

In starting the operation, the drive instruction signal S1 is supplied to the switch control circuit 45 so as to render the driving circuit 4 active. At the same time, the direction instruction signal S2 is supplied to the switch control circuit 45 so as to determine whether the movable section 3 is moved to the right or to the left in FIG. 1A. The following description is on the basis that the movable section 3 is moved to the right unless otherwise pointed out specifically.

Figure 3:
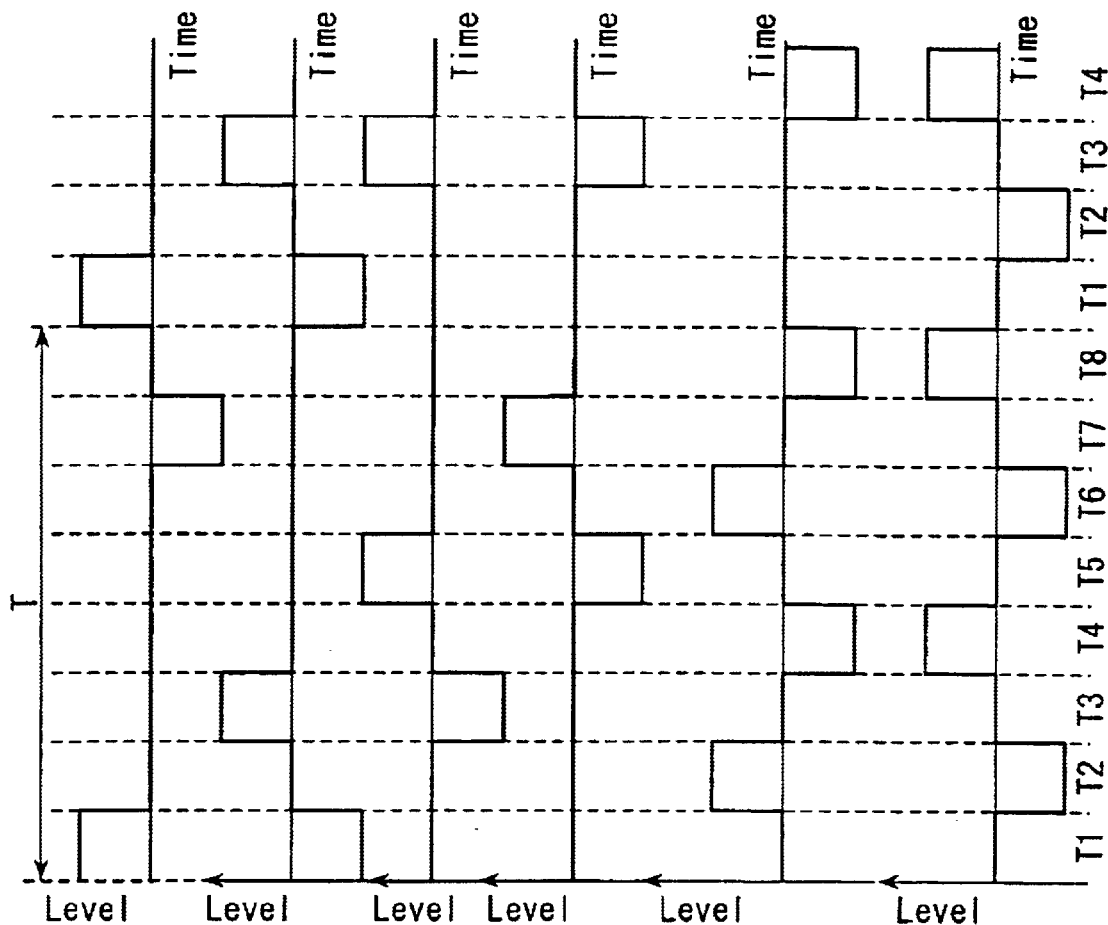
FIGS. 3A to 3F are timing charts for describing the operation of the electrostatic actuator shown in FIGS. 1A and 1B.
Figure 4:
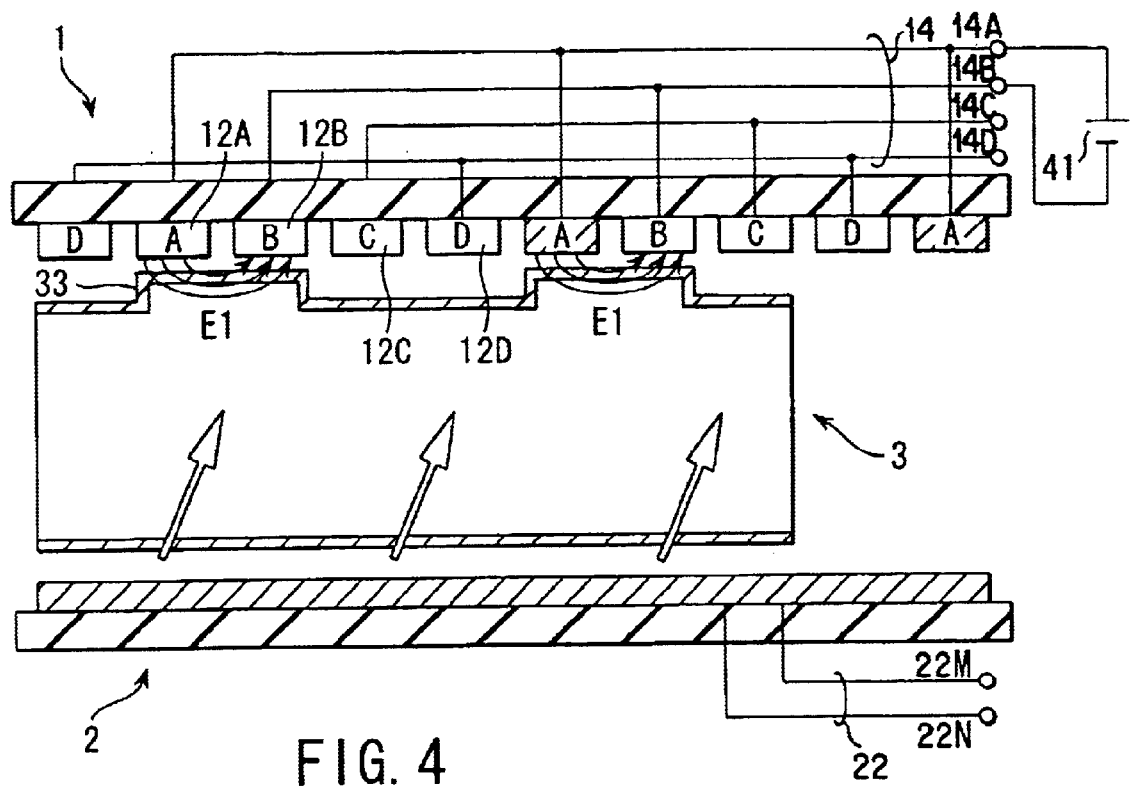
FIG. 4 schematically shows how the first step is performed for operating the electrostatic actuator shown in FIGS. 1A and 1B.

In response to the drive instruction signal S1 and the direction instruction signal S2, a positive voltage and a negative voltage are applied from the DC voltage source 41 to the electrode 12A and the electrode 12B, respectively, through the switching circuit 43 for a predetermined period T1, as shown in FIGS. 3A and 3B. In this stage, the electrode 12A, the fifth electrode 33 and the electrode 12B collectively form a series circuit including two capacitors, and a line E1 of electric force runs through the electrode 12A, the fifth electrode 33 and the electrode 12B. It should be noted that the line E1 of electric force tends to shrink as much as possible. As a result, an electrostatic attractive force is generated between the electrodes 12A, 12B and the fifth electrode 33 so as to cause the movable section 3 to be moved toward the first stator section 1.

Figure 5:
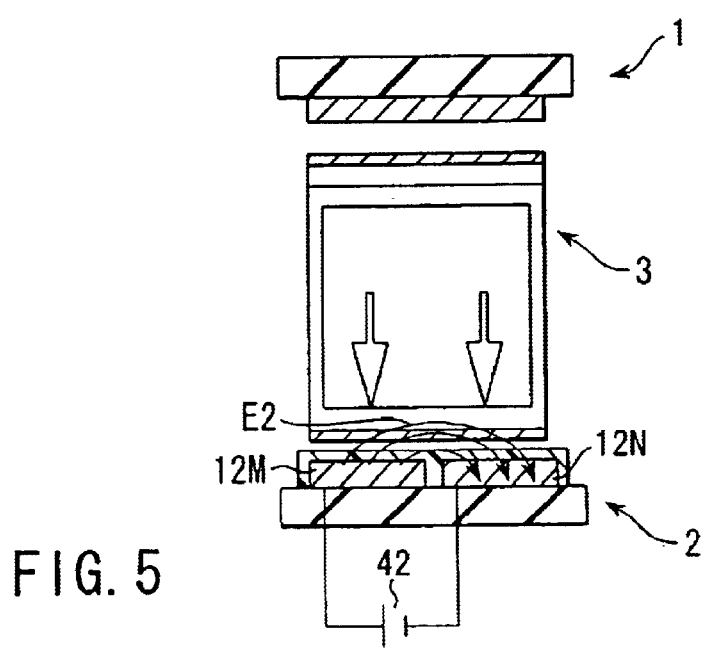
FIG. 5 schematically shows how the second step is performed for operating the electrostatic actuator shown in FIGS. 1A and 1B.
Figure 6:
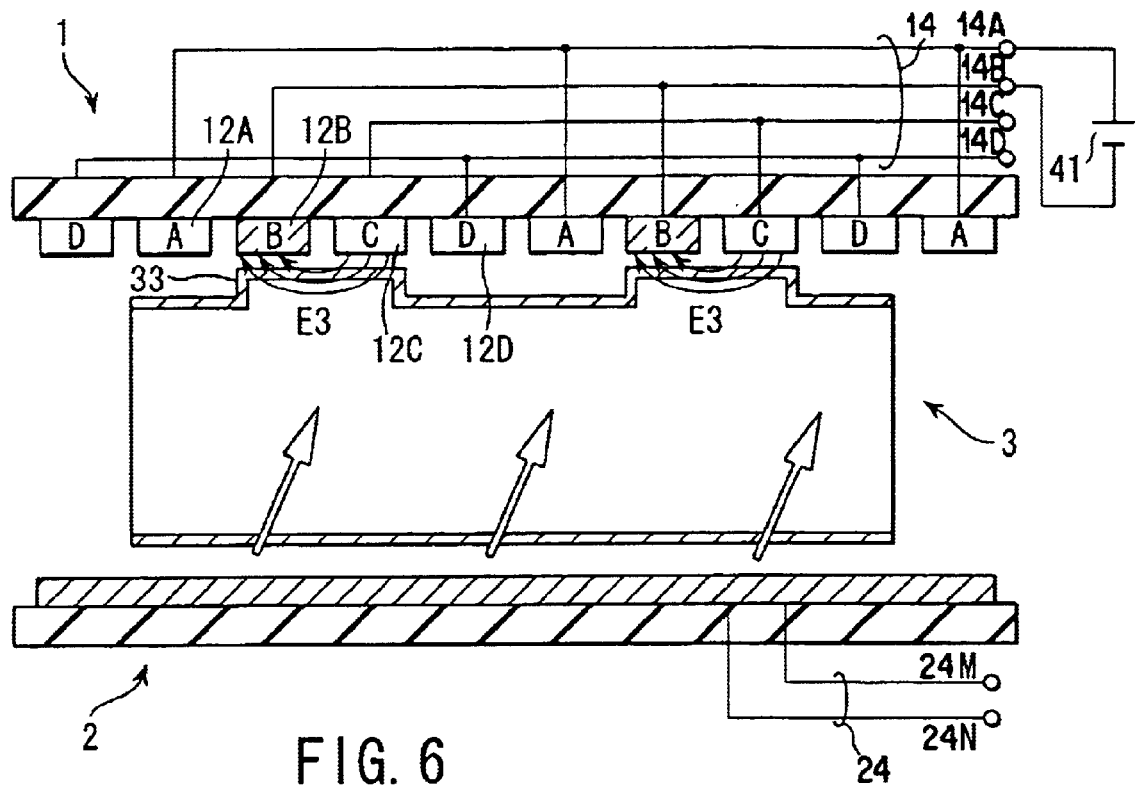
FIG. 6 schematically shows how the third step is performed for operating the electrostatic actuator shown in FIGS. 1A and 1B.
Figure 7:
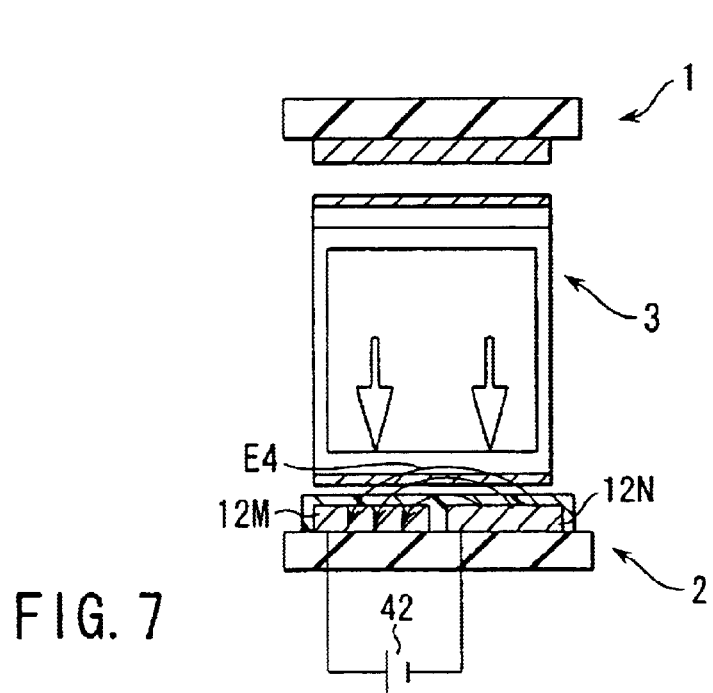
FIG. 7 schematically shows how the fourth step is performed for operating the electrostatic actuator shown in FIGS. 1A and 1B.

In the next step, positive and negative voltages are applied from the DC voltage source 42 to the electrode 22M and 22N, respectively, through the switching circuit 44 for a predetermined period T2, as shown in FIGS. 3E and 3F. In this stage, the circuit formed of the electrode 22M, the sixth electrode 34 and the electrode 22N corresponds to an equivalent series circuit including two capacitors so as to generate a line E2 of electric force running through the electrode 22M, the sixth electrode 34 and the electrode 22N, as shown in FIG. 5. The line E2 of electric force thus generate also tends to shrink and, thus, an electrostatic attractive force is generated between the electrode 22M, 22N and the sixth electrode 34. It follows that the movable section 3 is moved toward the second stator section 2.

Further, a positive voltage and a negative voltage are applied to the electrode 12B and the electrode 12C, respectively, during a period T3 as shown in FIGS. 3B and 3C. As a result, line E3 of electric force is generated to run through the electrode 12B, the fifth electrode 33 and the electrode 12C, and an electrostatic attractive force is generated between the electrodes 12B, 12C and the fifth electrode 33. It follows that the movable section 3 is moved toward the first stator section 1. It should be noted that the electrodes 12B, 12C included in the first electrode array 12 and having voltages applied thereto are deviated by one pitch (P) from the electrodes 12A, 12B to which the voltages were applied previously during the period T1. It follows that the movable section 3 is moved to the right by one pitch P when moved toward the first stator section 2.

In the next step, a positive voltage and a negative voltage are applied to the electrode 22N and the electrode 22M, respectively, during a period T4, as shown in FIGS. 3E and 3F. As a result, a line E4 of electric force is generated to run through the electrode 22N, the sixth electrode 34 and the electrode 22M so as to generate an electrostatic attractive force between the electrodes 22M, 22N and the sixth electrode 34. It follows that the movable section 3 is moved toward the second stator section.

Likewise, a positive voltage and a negative voltage are applied to the electrode 12C and the electrode 12D, respectively, during a period T5, as shown in FIGS. 3C and 3D and, then, a positive voltage and a negative voltage are applied to the electrode 22M and the electrode 22N, respectively, during a period T6 like during the period T2, as shown in FIGS. 3E and 3F. Then, a positive voltage and a negative voltage are applied to the electrode 12D and the electrode 12A, respectively, during a period T7, as shown in FIGS. 3D and 3A and, then, a positive voltage and a negative voltage are applied to the electrode 22N and the electrode 22M, respectively, during a period T8 like during the period T4, as shown in FIGS. 3E and 3F. The operations described above are successively performed so as to finish the operation of one period T consisting of the periods T1 to T8 referred to above.

By the operation described above, the movable section 3 is successively moved macroscopically pitch by pitch in the arranging direction (X-direction) of the first electrode array 12 on the first stator section 1, i.e., to the right in FIG. 1A, while being vibrated microscopically between the first stator section 1 and the second stator section 2.

Where the direction instruction signal S2 instructing the movement of the movable section 3 to the right in FIG. 1A is supplied to the switch control circuit 45, the DC voltage is applied successively between the electrodes 12D and 12A, between the electrodes 22M and 22N, between the electrodes 12C and 12C, between the electrodes 22N and 22M, between the electrodes 12B and 12C, between the electrodes 22M and 22N, between the electrodes 12A and 12B, and between the electrodes 22N and 22M from the period T8 toward the period T1 shown in FIGS. 3A to 3F. As a result, the movable section 3 is successively moved macroscopically to the left in FIG. 1A while being vibrated between the first stator section 1 and the second stator section 2.

In the electrostatic actuator of the first embodiment described above, the movable section 3 is alternately attracted by utilizing the electrostatic force generated by applying the DC voltage between the adjacent electrodes in any of the first electrode array 12 on the first stator section 1 and the second electrode array on the second stator section 2. In other words, the movable section 3 is alternately attracted by the shrinking function of the lines of electric force running through the fifth electrode 33 and the sixth electrode 34 on the movable section 3. Where the particular attracting function is utilized for attracting the movable section 3, it suffices for the fifth electrode 33 and the sixth electrode 34 on the movable section 3 to be floating electrodes. In other words, it is unnecessary to use a wiring for connecting these third and fourth electrodes 33 and 34 to the driving circuit 34. It follows that the particular construction is advantageous for the improvement in the mass production capability and the miniaturization of the electrostatic actuator. In addition, it is possible to solve the problem in respect of the reliability derived from the stress application caused by the movement of the movable section 3.

Further, if attentions are paid to a single electrode in the first embodiment of the present invention, the polarity of the applied DC voltage is alternately reversed. For example, a positive voltage is applied to the electrode 12A in the period T1 and, then, a negative voltage is applied to the electrode 12A in the next period T3. This is also the case with each of the electrodes 12B, 12C, 12D, 22M and 22N. By the particular voltage application, the charging caused by the dielectric polarization of the dielectric films 13, 23 formed as a measure against the insulation breakdown is canceled by the application of the voltage of the opposite polarity. As a result, it is possible to prevent the moving operation of the movable section 3 from being rendered unstable by the dielectric polarization.

In the first embodiment of the present invention, the sixth electrode 34 on the movable section 3 is formed on the flat surface of the insulating substrate 31. As a modification of the first embodiment, it is also possible to form a convex portion on the bottom surface of the insulating substrate 31 in a manner to correspond to the electrodes 22M and 22N constituting the second electrode array 22 on the second stator section 2 and to form the sixth electrode 34 on the convex portion. It is also possible the entire movable section 3 to be formed of a conductive material such that the portion of the movable section 3 facing the electrodes 12A, 12B, 12C and 12D of the first electrode array 12 is allowed to perform the function of the fifth electrode 33, and that the portion of the movable section 3 facing the electrodes 22M and 22N of the second electrode array 22 is allowed to perform the function of the sixth electrode 34. This is also the case with any of the other embodiments described in the following.

(Second Embodiment)

Figure 8:
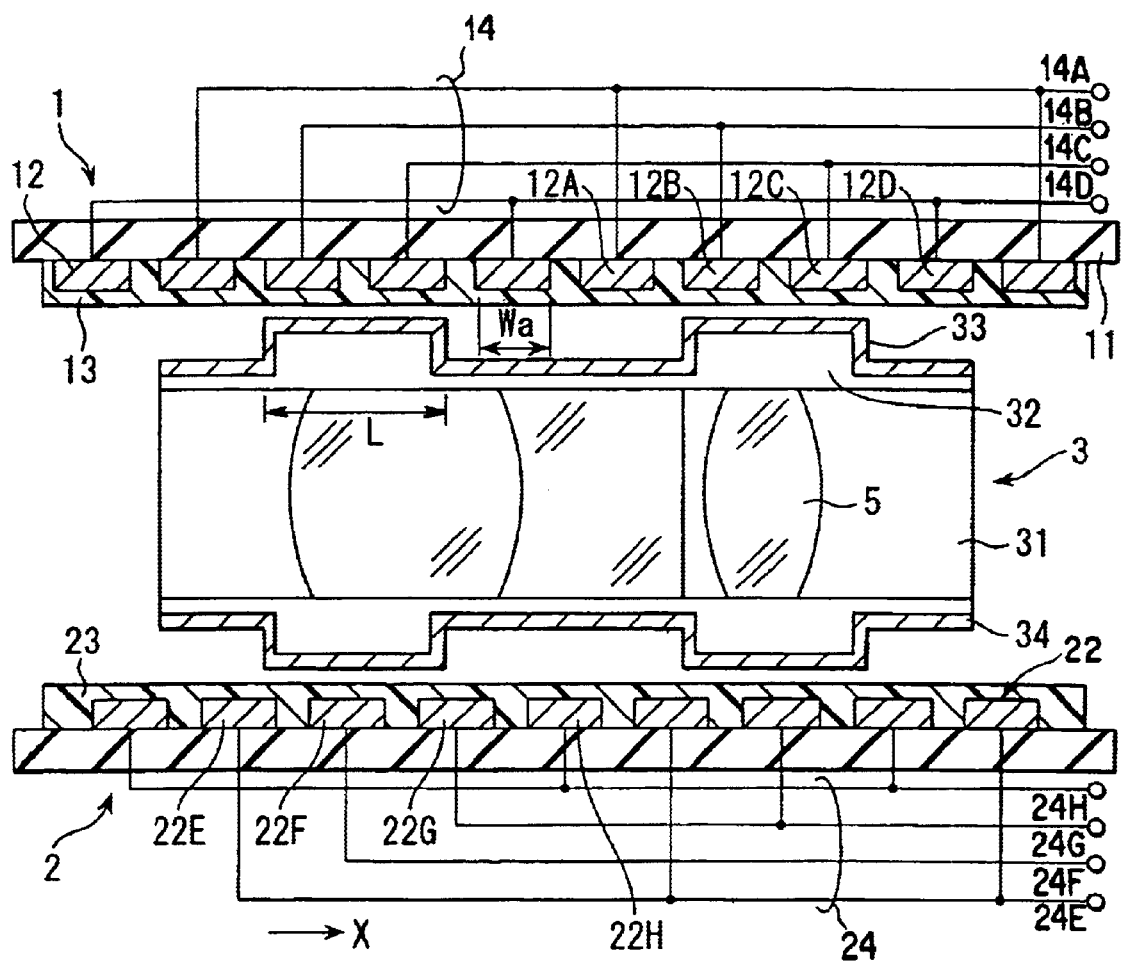
FIG. 8 is a cross sectional view schematically showing the construction of the electrostatic actuator according to a second embodiment of the present invention in a longitudinal direction of the electrostatic actuator.
Figure 9:
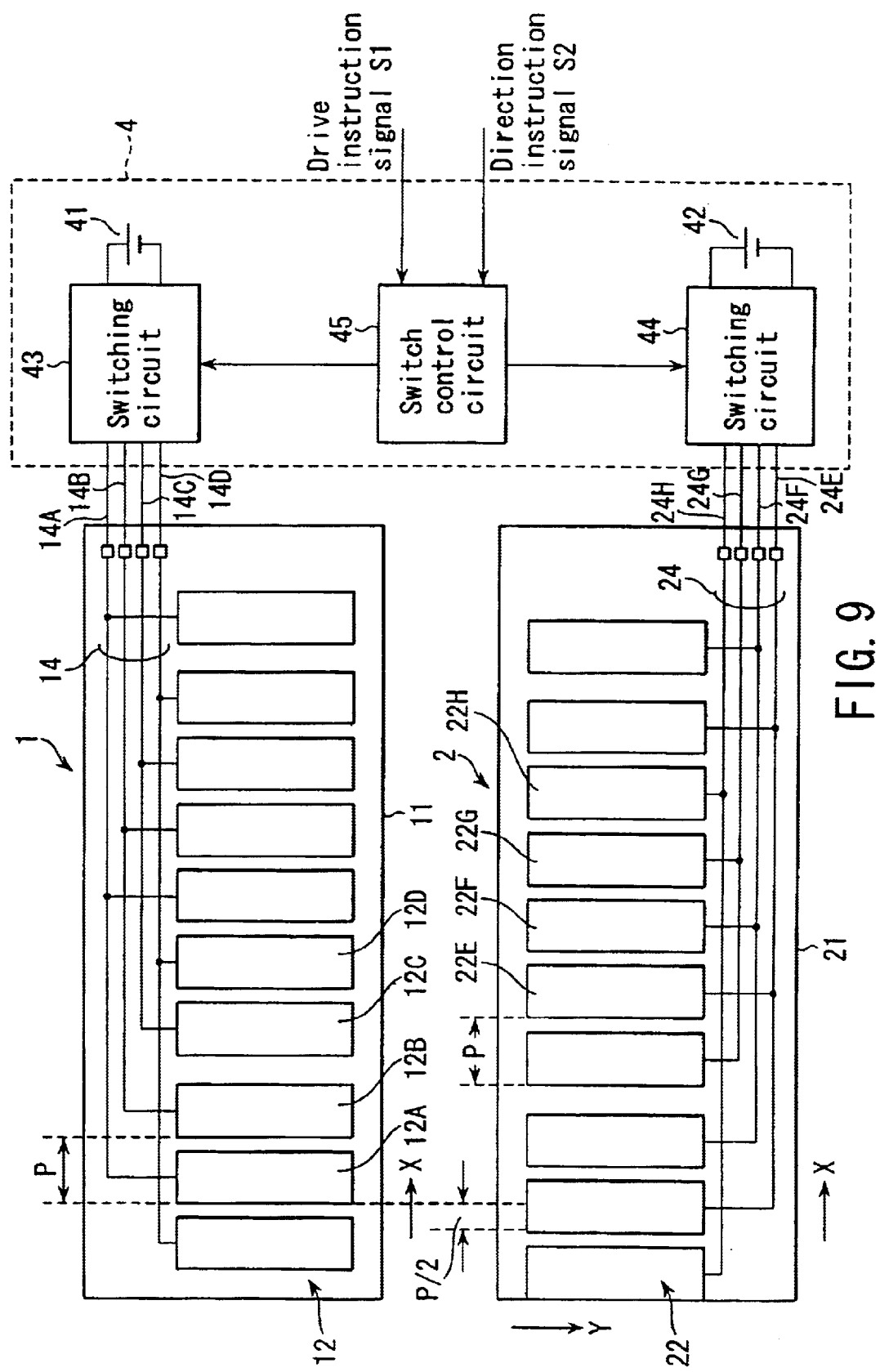
FIG. 9 schematically shows the constructions of the first electrode array and the second electrode array on the first stator section and the second stator section shown in FIG. 8, respectively, as well as the construction of the driving circuit.

FIG. 8 is a cross sectional view showing the electrostatic actuator according to a first embodiment of the present invention in the longitudinal direction (X-direction), and FIG. 9 shows the planar shapes of the electrode arrays on the first stator section and the second stator section as well as the inner structure of the driving circuit. The electrostatic actuator as shown in FIGS. 1A, 1B and 2 is so called as one-side propagation type in which only the first stator section 1 applies a propagation force to the movable section 3. In contrast, the electrostatic actuator as shown in FIGS. 8 and 9 is so called as both-side propagation type in which both of the first and second stator sections 1, 2 apply the propagation force to the movable section 3.

The electrostatic actuator shown in FIGS. 8 and 9 comprises a first stator section 1 having a same configuration as that shown in FIG. 2, and a second stator section 2 arranged to face the first stator section, which includes a large number of strip-like electrodes arranged at a predetermined pitch P in the longitudinal direction of the substrate 11, i.e., the first direction or the X-direction. In the second stator section 2, an array of electrodes 22 is arranged with a same phase as that of the first stator section 1 and has an arrangement of the electrode deviation by P/2 pitch in respect to that of the first stator section 1. In the second stator section 2, first electrodes 22E are commonly connected by a wiring 24E so as to be connected to the driving circuit 4. Similarly, second electrodes 22F are commonly connected by the wiring 24F so as to be connected to the driving circuit 4, and third electrodes 22G are commonly connected by the wiring 24G so as to be connected to the driving circuit 4. Further, fourth electrodes 22H are commonly connected by the wiring 24H so as to be connected to the driving circuit 4. The wiring 24 is of a two layer structure having an insulating layer interposed between the upper and lower conductive layers. In other words, the wiring 24 is of a steric wiring structure constructed such that one end of each of the upper and lower conductive layers is connected to the driving circuit 4.

A movable section 3 is formed of a hollow parallelepiped insulating substrate 31, as shown in FIG. 8. The insulating substrate 31 includes a convex portion 32 on the side facing the first electrode array 12 on the first stator section 1. The fifth electrode 33 is mounted to the surface of the convex portion 32 facing the first electrode array 12, and the sixth electrode 34 is mounted to the surface of the convex portion 32 facing the second electrode array 22 on the second stator section 2. The movable section 3 is arranged movable in the right-left direction (X-direction) in the moving space between the first stator section 1 and the second stator section 2. On the other hand, the fifth electrode 33 and the sixth electrode 34 are not connected to the driving circuit 4 and are in an electrically floating state so as to form so-called "floating electrodes".

As shown in FIG. 9, the driving circuit 4 includes two DC voltage sources 41, 42, two switching circuits 43, 44 serving to switch the DC voltage signals generated from the DC voltage sources 41, 42 so as to generate rectangular wave form voltage signals, and a switch control circuit 45 serving to control the outputs of the rectangular wave form voltage signals generated from the switching circuits 43, 44. The switching circuit 43 serving to connect the first electrode array 12 to the DC voltage source 41 via the wiring 14 includes an input terminal and an output terminal. The output generated from the output terminal is controlled by a control signal generated from the switch control circuit 45 and supplied to the input terminal. Likewise, the switching circuit 44 serving to connect the second electrode array 22 to the DC voltage source 42 includes an input terminal and an output terminal. The output generated from the output terminal is controlled by a control signal generated from the switch control circuit and supplied to the input terminal. The switch control circuit 45 is constructed to control the switching circuits 43, 44 in accordance with a drive instruction signal S1 and a direction instruction signal S2 generated from, for example, a host computer (not shown).

The operation of the electrostatic actuator according to the second embodiment of the present invention will now be described with reference to the time charts shown in FIGS. 10A to 10H and to the operating states shown in FIG. 11. FIGS. 10A to 10H show the wave forms of the voltages applied to the electrodes 12A, 12B, 12C, 12D, 22E, 22F, 22G and 22H, and FIG. 11 show how the movable section 3 is moved.

In starting the operation, the drive instruction signal S1 is supplied to the switch control circuit 45 so as to render the driving circuit 4 active. At the same time, the direction instruction signal S2 is supplied to the switch control circuit 45 so as to determine whether the movable section 3 is moved to the right or to the right in FIG. 8. The following description is on the basis that the movable section 3 is moved to the right unless otherwise pointed out specifically.

In response to the drive instruction signal S1 and the direction instruction signal S2, a positive voltage and a negative voltage are applied from the DC voltage source 41 to the electrode 12A and the electrode 12B, respectively, through the switching circuit 43 for a predetermined period T1, as shown in FIGS. 11A and 11B. In this stage, the electrode 12A, the electrode 33 and the electrode 12B collectively form a series circuit including two capacitors, and lines E1 of electric force run through the electrode 12A, the electrode 33 and the electrode 12B. It should be noted that the lines E1 of electric force tends to shrink as much as possible. As a result, an electrostatic attractive force is generated between the electrodes 12A, 12B and the electrode 33 so as to cause the movable section 3 to be moved toward the first stator section 1.

Figure 10:
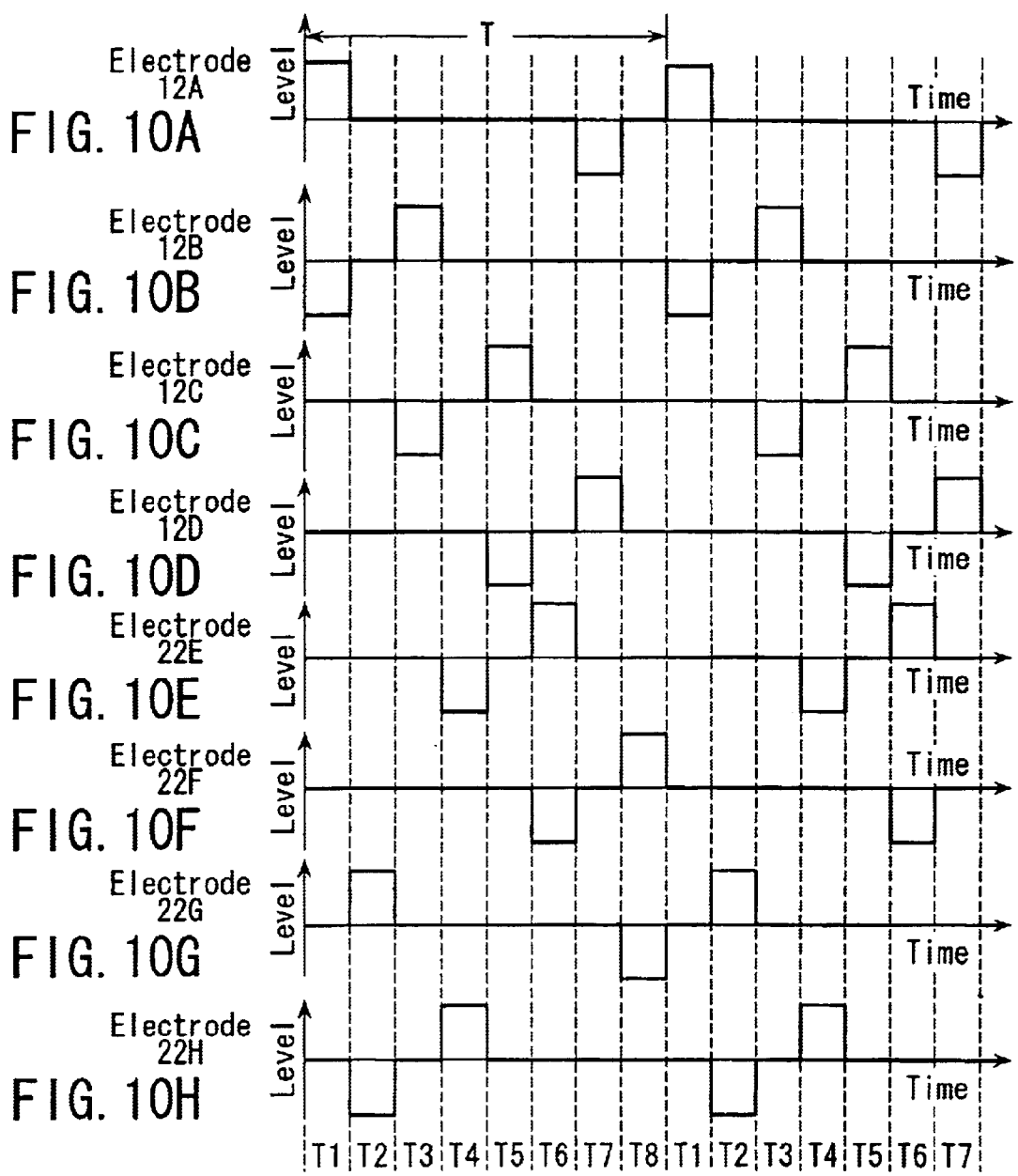
FIGS. 10A to 10H are timing charts for describing the operation of the electrostatic actuator shown in FIG. 8.
Figure 11:
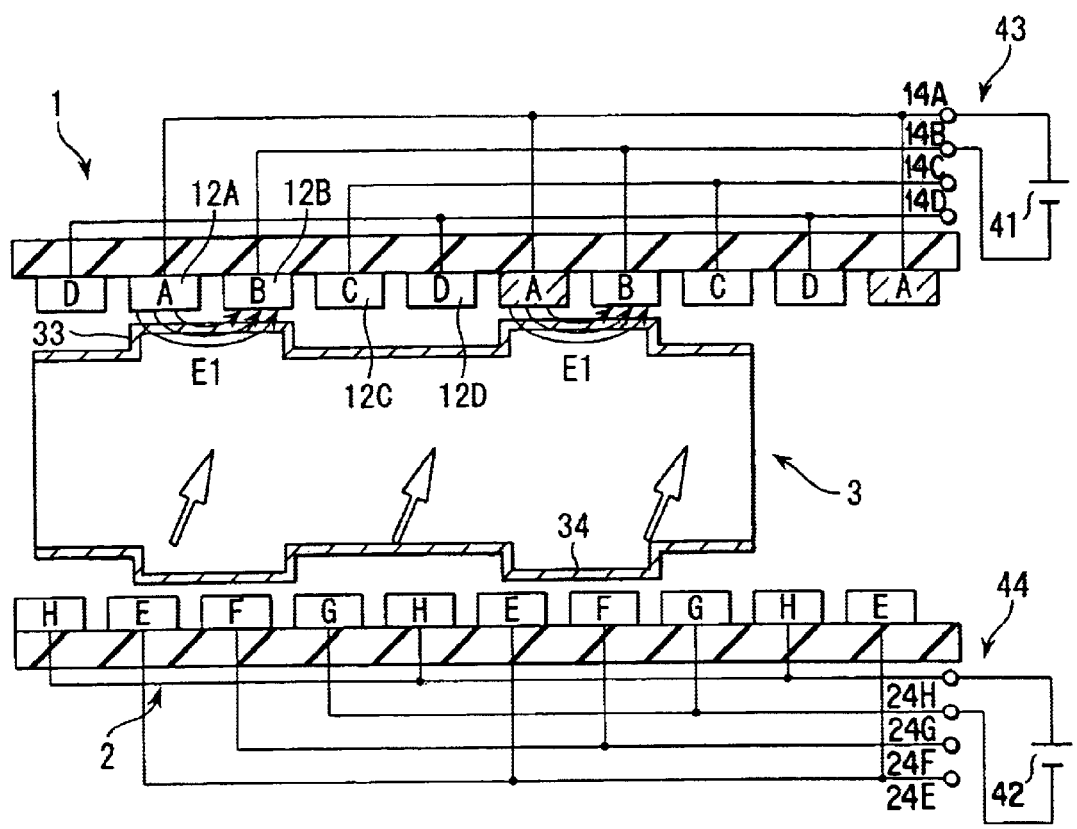
FIG. 11 schematically shows how the first step is performed for operating the electrostatic actuator shown in FIG. 8.

In the next step, positive and negative voltages are applied from the DC voltage source 42 to the electrode 22G and 22H, respectively, through the switching circuit 44 for a predetermined period T2, as shown in FIGS. 10G and 10H. In this stage, the circuit formed of the electrode 22G, the electrode 34 and the electrode 22H corresponds to an equivalent series circuit including two capacitors so as to generate lines E2 of electric force running through the electrode 22G, the electrode 34 and the electrode 22H. The lines E2 of electric force thus generate also tends to shrink and, thus, an electrostatic attractive force is generated between the electrode 22G, 22H and the electrode 34. It follows that the movable section 3 is moved toward the second stator section 2. The electrodes 22G, 22H of the first electrode array 22, to which positive and negative voltages are applied, are deviated by P/2 pitch from the electrodes 12A and 12B of the first electrode array 12 to which voltages have been applied during the period T1. Thus, the movable section 3 is moved by P/2 pitch in the right direction at the time of moving the movable section 2 from the first stator section 12 toward the second stator section 22.

Further, a positive voltage and a negative voltage are applied to the electrode 12B and the electrode 12C, respectively, during a period T3 as shown in FIGS. 10B and 10C. As a result, lines E3 of electric force are generated to run through the electrode 12B, the electrode 33 and the electrode 12C, and an electrostatic attractive force is generated between the electrodes 12B, 12C and the electrode 33. It follows that the movable section 3 is moved toward the first stator section 1. It should be noted that the electrodes 12B, 12C included in the first electrode array 12 and having voltages applied thereto are deviated by one pitch (P) from the electrodes 12A, 12B to which the voltages were applied previously during the period T1. It follows that the movable section 3 is moved to the right when moved toward the first stator section 2.

In the next step, a positive voltage and a negative voltage are applied to the electrode 22E and the electrode 22H, respectively, during a period T4, as shown in FIGS. 10E and 10H. As a result, lines E4 of electric force are generated to run through the electrode 22E, the electrode 34 and the electrode 22H so as to generate an electrostatic attractive force between the electrodes 22E, 22H and the electrode 34. It follows that the movable section 3 is moved toward the second stator section 22.

Likewise, a positive voltage and a negative voltage are applied to the electrode 12C and the electrode 12D, respectively, during a period T5, as shown in FIGS. 10C and 10D and, then, a positive voltage and a negative voltage are applied to the electrode 22E and the electrode 22F, respectively, during a period T6 like during the period T2, as shown in FIGS. 10E and 10F. Then, a positive voltage and a negative voltage are applied to the electrode 12D and the electrode 12A, respectively, during a period T7, as shown in FIGS. 10D and 10A and, then, a positive voltage and a negative voltage are applied to the electrode 22F and the electrode 22G, respectively, during a period T8 like during the period T4, as shown in FIGS. 10F and 10G. The operations described above are successively performed so as to finish the operation of one period T consisting of the periods T1 to T8 referred to above.

By the operation described above, the movable section 3 is successively moved macroscopically pitch by pitch in the arranging direction (X-direction) of the first electrode array 12 on the first stator section 1, i.e., to the right in FIG. 8, while being vibrated microscopically between the first stator section 1 and the second stator section 2.

Where the direction instruction signal S2 instructing the movement of the movable section 3 to the left in FIG. 8 is supplied to the switch control circuit 45, the DC voltage is applied successively between the electrodes 12D and 12A, between the electrodes 22F and 22G, between the electrodes 12C and 12D, between the electrodes 22E and 22F, between the electrodes 12B and 12C, between the electrodes 22M and 22N, between the electrodes 12A and 12B, and between the electrodes 22H and 22E from the period T8 toward the period T1 shown in FIGS. 10A to 10H. As a result, the movable section 3 is successively moved macroscopically to the left in FIG. 8 while being vibrated between the first stator section 1 and the second stator section 2.

(Third Embodiment)

Figure 12:
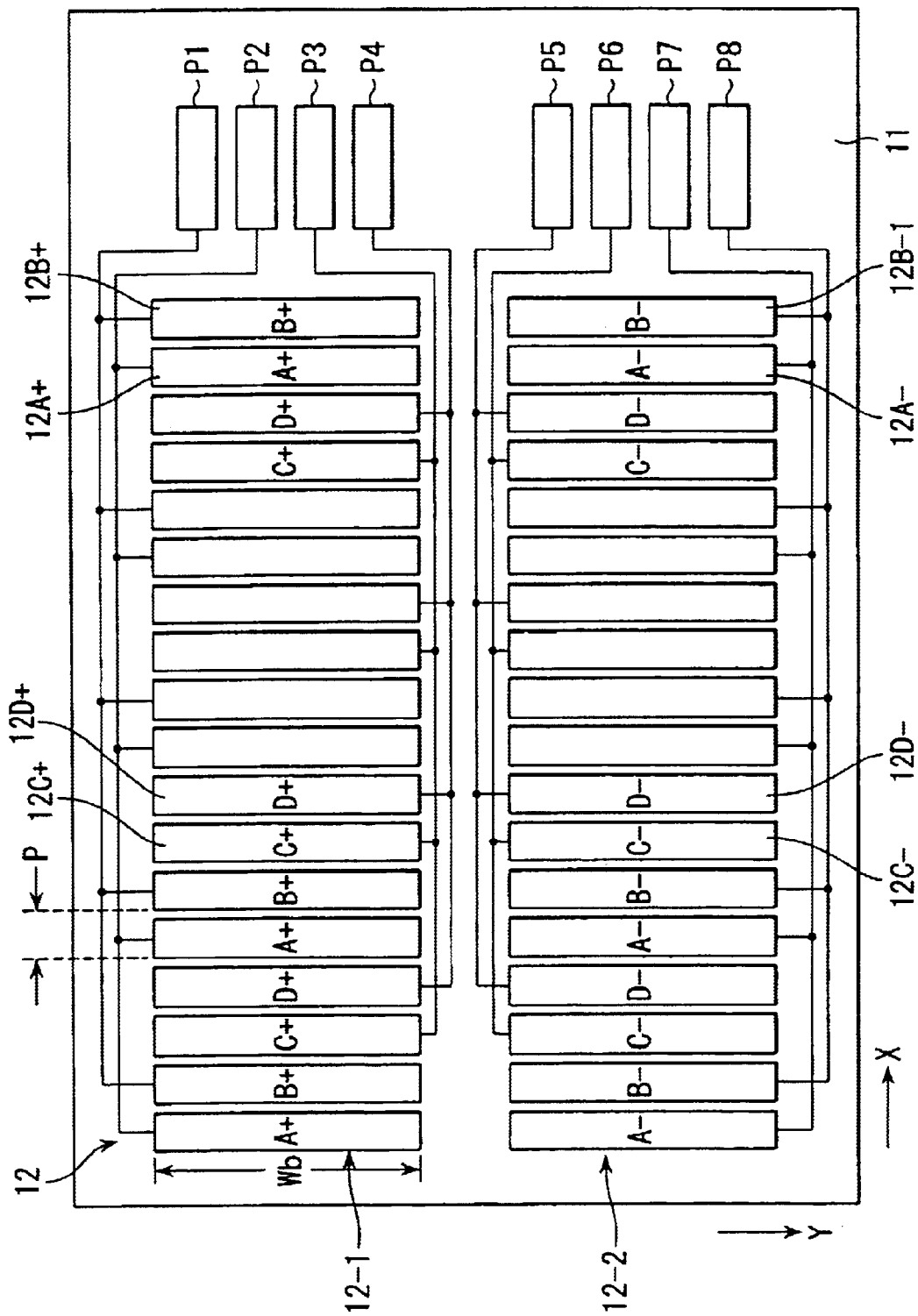
FIG. 12 is a plan view schematically showing the construction of the electrode array on the first stator section in an electrostatic actuator according to a third embodiment of the present invention.

In the first embodiment described above, the electrodes forming the first electrode array 12 on the first stator section 1 are aligned to form a single row in the moving direction (first direction or X-direction) of the movable section 3, and the DC voltage is applied between the adjacent electrodes in the X-direction of the first electrode array 12. In the third embodiment of the present invention, however, a first electrode group 12-1 and a second electrode group 12-2 are arranged side by side so as to form the first electrode array 12, as shown in FIG. 12. In each of the first and second electrode groups 12-1 and 12-2, a plurality of electrodes are arranged in the first direction (X-direction). Also, the first and second electrode groups 12-1 and 12-2 are arranged a predetermined distance apart from each other in the second direction (Y-direction) perpendicular to the first direction (X-direction). In the third embodiment of the present invention, a DC voltage is applied between the electrodes included in the first and second electrode groups 12-1 and 12-2, i.e., between the electrodes adjacent to each other in the Y-direction. In short, the third embodiment clearly differs from the first embodiment in the arrangement of the electrodes on the stator section and in the manner of the voltage application.

FIG. 12 is a plan view showing the first electrode array 12 on the first stator section 1 included in the electrostatic actuator according to the third embodiment of the present invention. As shown in the drawing, the first electrode array 12 includes the first electrode group 12-1 consisting of electrodes 12A+, 12B+, 12C+, 12D+ and the second electrode group 12-2 consisting of electrodes 12A−, 12B−, 12C−, 12D−. On the other hand, the second electrode array 22 on the second stator section 2 consists of two band-like electrodes 22M and 22N arranged a predetermined distance apart from each other and extending in the longitudinal direction (X-direction) of the substrate 21 as in the first embodiment shown in FIG. 2. Further, the fifth electrode 33 is formed on the movable section 3 in two rows in a manner to correspond to the first and second electrode groups 12-1 and 12-2 of the first electrode array 12.

Incidentally, the symbols (+) and (−) put to the electrodes of the first electrode array 12 do not imply the positive (+) and negative (−) potentials used in the electric field. Specifically, these symbols (+) and (−) represent the relationship that, if the potential of the electrode marked with the symbol (+) is positive, the potential of the electrode marked with the symbol (−) is negative, and that, if the potential of the electrode marked with the symbol (+) is negative, the potential of the electrode marked with the symbol (−) is positive.

The electrodes 12A+, 12A−, the electrodes 12B+, 12B−, the electrodes 12C+, 12C−, and the electrodes 12D+, 12D− correspond to the electrodes 12A, 12B, 12C and 12D, respectively, of the first embodiment. The electrodes 12A+ are commonly connected to a conductive pad P2. The electrodes 12B+ are commonly connected to a conductive pad P1. The electrodes 12C+ are commonly connected to a conductive pad P3. Further, the electrodes 12D+ are commonly connected to a conductive pad P4. Likewise, the electrodes 12A−, 12B−, 12C− and 12D− are commonly connected to conductive pads P7, P8, P6, and P5, respectively. These conductive pads P1, P2, P3, P4, P5, P6, P7 and P8 are connected to the driving circuit 4, as in FIG. 2. The driving circuit 4 comprises the DC voltage sources 41, 42, the switching circuits 43, 44, and the switch control circuit 45, as shown in FIG. 2. However, the driving circuit in the third embodiment differs from the driving circuit 4 in the first embodiment shown in FIG. 2 in the switching circuit 43 connected between the DC voltage source 41 and the first electrode array 12. Specifically, in the third embodiment of the present invention, the switching circuit 43 has 8 output terminals, not 4 output terminals.

The operation of the electrostatic actuator according to the third embodiment of the present invention will now be described with reference to the time charts shown in FIGS. 9A to 9J. Specifically, FIGS. 9A to 9J show the wave forms of the voltages applied to the electrode 12A+, the electrode 12A−, the electrode 12B+, the electrode 12B−, the electrode 12C+, the electrode 12C−, the electrode 12D+, the electrode 12D−, the electrode 22M and the electrode 22N, respectively.

Figure 13:
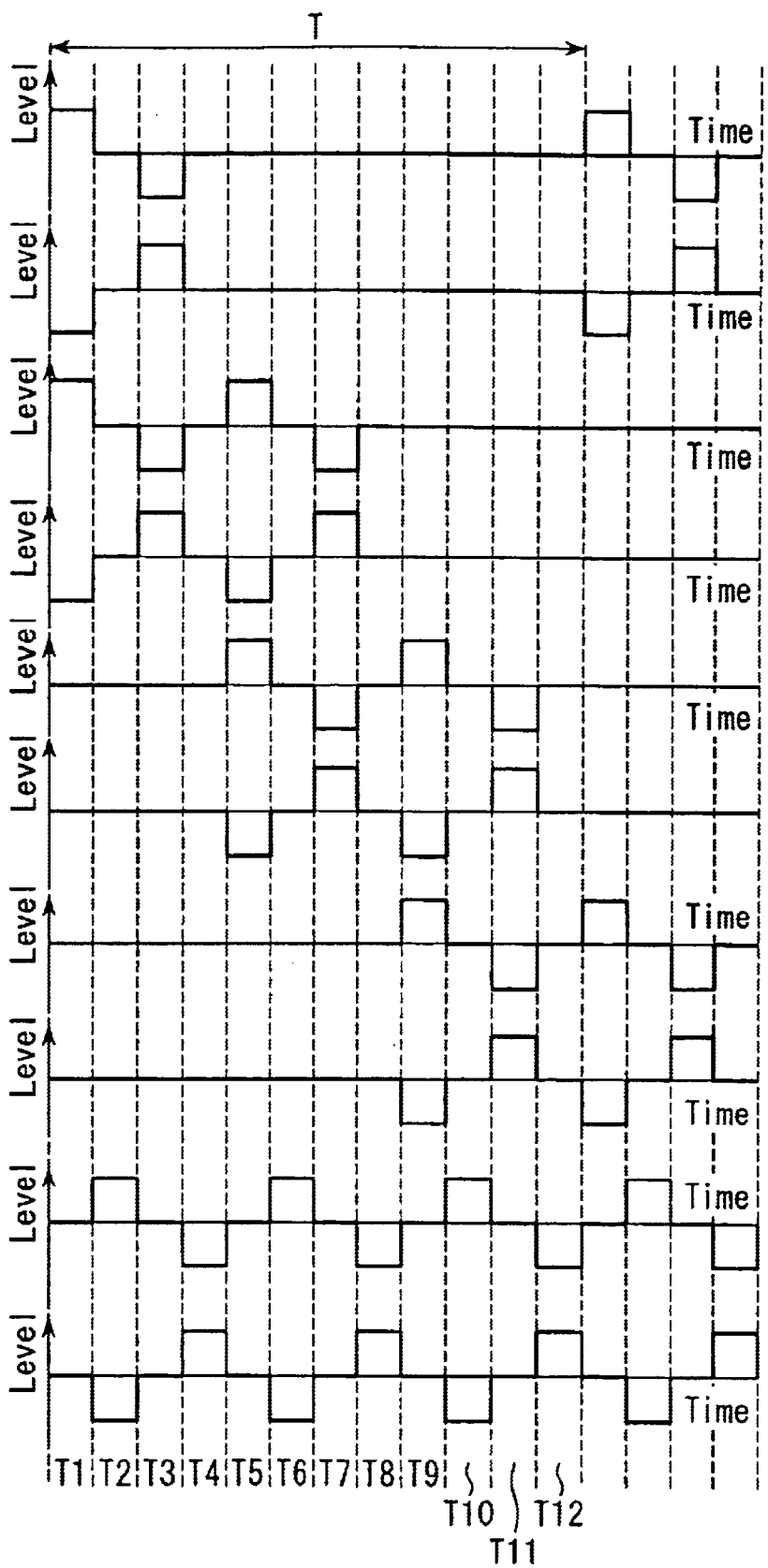
FIGS. 13A to 13J are timing charts for describing the operation of the electrostatic actuator shown in FIG. 12.

In the first step, a positive voltage is applied to the electrode 12A+ as shown in FIG. 13A, a negative voltage is applied to the electrode 12A− as shown in FIG. 13B, a positive voltage is applied to the electrode 12B+ as shown in FIG. 13C, and a negative voltage is applied to the electrode 12B− as shown in FIG. 13D. In this stage, each of the circuit formed of the electrode 12A+, the fifth electrode 33 and the electrode 12A− and the circuit formed of the electrode 12B+, the fifth electrode 33 and the electrode 12B− forms an equivalent series circuit including two capacitors. As a result, generated are lines of electric force running through the route consisting of the electrode 12A+, the fifth electrode 33, and the electrode 12A− and the route consisting of the electrode 12B+, the fifth electrode 33 and the electrode 12B−. Since these lines of electric force tend to shrink as much as possible, an electrostatic attractive force is generated between the electrodes 12A+, 12A−, 12B+, 12B− and the fifth electrode 33, with the result that the movable section 3 is moved toward the first stator section 1.

In the next step, a positive voltage is applied to the electrode M22 as shown in FIG. 13I and a negative voltage is applied to the electrode N22 as shown in FIG. 13J. In this stage, the circuit formed of the electrode M22, the sixth electrode 34 and the electrode N22 corresponds to a series equivalent circuit including two capacitors and, thus, lines of electric force are formed to run through the electrode M22, the sixth electrode 34 and the electrode N22. Since the lines of electric force thus formed tend to shrink as much as possible, an electrostatic attractive force is generated between the electrodes M22, N22 and the sixth electrode 34, with the result that the movable section 3 is moved toward the second stator section 2.

In the next step, which is not absolutely necessary, the voltages of the polarity opposite to that of the voltages applied during the period T1 are applied during a period T3 such that a negative voltage is applied to the electrode 12A+, a positive voltage is applied to the electrode 12A−, a negative voltage is applied to the electrode 12B+, and a positive voltage is applied to the electrode 12B−. Further, the voltages of the polarity opposite to that of the voltages applied during the period T2 are applied during a period T4 such that a negative voltage is applied to the electrode 22M, a positive voltage is applied to the electrode 22N. Since the voltages of the polarity opposite to that of the voltages applied during the periods T1 and T2 are applied to the electrodes 12A+, 12A−, 12B+, 12B−, 22M and 22N during the periods T3 and T4, the charge generated by the dielectric polarization of the dielectric films 13, 23 formed as a measure against the insulation breakdown is discharged, with the result that the moving operation of the movable section 3 is prevented from being rendered unstable by the dielectric polarization.

Then, a positive voltage is applied to the electrode 12B+ as shown in FIG. 13B, a negative voltage is applied to the electrode 12B− as shown in FIG. 13D, a positive voltage is applied to the electrode 1CB+ as shown in FIG. 13E and a negative voltage is applied to the electrode 12C− as shown in FIG. 13F. In this stage, an electrostatic attractive force is generated between the electrodes 12B+, 12B−, 12C+, 12c− and the third electrode 3e3, with the result that the movable section 3 is moved toward the first stator section 2. It should be noted that the electrodes 12B+, 12B−, 12C+, 12C− of the first electrode array 12 to which the voltage is applied are deviated by one pitch from the electrodes 12A+, 12A−, 12B+, 12B− to which the voltage was applied previously during the period T1. It follows that the movable section 3 is moved to the right by one pitch when moved toward the first stator section 1. Then, a positive voltage is applied to the electrode M22 and a negative voltage is applied to the electrode N22 during a period T6 as shown in FIGS. 9I and 9J. As a result, an electrostatic attractive force is generated between the electrodes 22M, 22N and the sixth electrode 34, with the result that the movable section 3 is moved toward the second stator section 2.

Further, the voltages of the polarity opposite to that of the voltages applied during the periods T5 and T6 are applied during a period T7 as during the periods T3 and T4 such that a negative voltage is applied to the electrode 12B+ as shown in FIG. 13C, a positive voltage is applied to the electrode 12B− as shown in FIG. 13D, a negative voltage is applied to the electrode 12C+ as shown in FIG. 13E, and a positive voltage is applied to the electrode 12C− as shown in FIG. 13F. Then, a negative voltage is applied to the electrode M22 and a positive voltage is applied to the electrode N22 during a period T8 as shown in FIGS. 9I and 9J so as to cancel the charge produced by the dielectric polarization of the dielectric films 13, 23. It follows that the moving operation of the movable section 3 is prevented from being rendered unstable by the dielectric polarization.

Similarly, a first driving operation in which a DC voltage is applied to two sets of the electrodes 12A+, 12B+, 12C+, 12D+ of the first electrode group 12-1 of the first electrode array 12 and the electrodes 12A−, 12B−, 12C−, 12D− of the second electrode group 12-2 of the first electrode array 12 and a second driving operation in which a DC voltage is applied to the electrodes M22, N22 are alternately repeated. In addition, the positions of the electrodes of the first electrode group 12-1 are successively deviated by one pitch from the electrodes of the second electrode group 12-2 during periods T9 to T12 such that the driving operation for one period T is finished by the periods T1 to T12.

By the driving operation described above, the movable section 3 is macroscopically moved to the right while being vibrated microscopically between the first stator section 1 and the second stator section 2, as in the first embodiment. If the order of applying the DC voltage to the electrodes is made opposite to that described above, the movable section 3 can be moved to the left in FIG. 12.

The third embodiment described above produces the effects similar to those produced by the first embodiment described previously. In addition, the third embodiment produces an additional prominent effect. Specifically, in the first embodiment of the present invention, the lines E1, E3, etc. of electric force running through the adjacent electrodes of the first electrode array 12 via the fifth electrode 33 contribute to the generation of the electrostatic attractive force between the first stator section 1 and the movable section 3. It is desirable for the size (width Wa) of each of the electrodes constituting the first electrode array 12 along the lines E1, E3, etc. of electric force to be sufficiently larger than the distance between the first stator section 1 and the movable section 3. If the width Wa is small, the lines E1, E3, etc. of electric force is decreased, with the result that the lines of electric force running through the side surfaces of the adjacent electrodes of the first electrode array 12 without running through the fifth electrode 33 is relatively increased. It should be noted that the lines of electric force that do not run through the fifth electrode 33 do not contribute to the generation of the electrostatic attractive force between the first stator section 1 and the movable section 3. It follows that it is undesirable for the lines of electric force, which do not run through the fifth electrode 33, to be increased, because the driving force of the movable section 3 is decreased. If the arranging pitch of the electrodes of the first electrode array 12 is increased, it is possible to increase the width Wa of the electrode so as to overcome the difficulty pointed out above. If the electrode arranging pitch is increased, however, the moving resolution of the movable section 3 is decreased. In other words, the moving amount per step is increased.

On the other hand, in the third embodiment of the present invention, the lines of electric force running through the electrodes 12A+, 12B+, 12C+, 12D+ of the first electrode group 12-1 of the first electrode array 12 and the electrodes 12A−, 12B−, 12C−, 12D− of the second electrode group 12-2 of the first electrode array 12 via the fifth electrode 33 contribute to the generation of the electrostatic attractive force between the first stator section 1 and the movable section 3. In this case, it is desirable for the size (length Wb) of the electrodes 12A+, 12B+, 12C+, 12D+, 12A−, 12B−, 12C−, 12D− along the lines of electric force to be sufficiently large, compared with the distance between the first stator section 1 and the movable section 3. It should be note that the length Wb can be increased easily regardless of the electrode arranging pitch P of the first electrode array 12. It follows that the lines of electric force running through the side surfaces of the adjacent electrodes of the first electrode array 12 without running through the fifth electrode 33 are relatively decreased so as to increase the driving force of the movable section 3.

(Fourth Embodiment)

Figure 14:
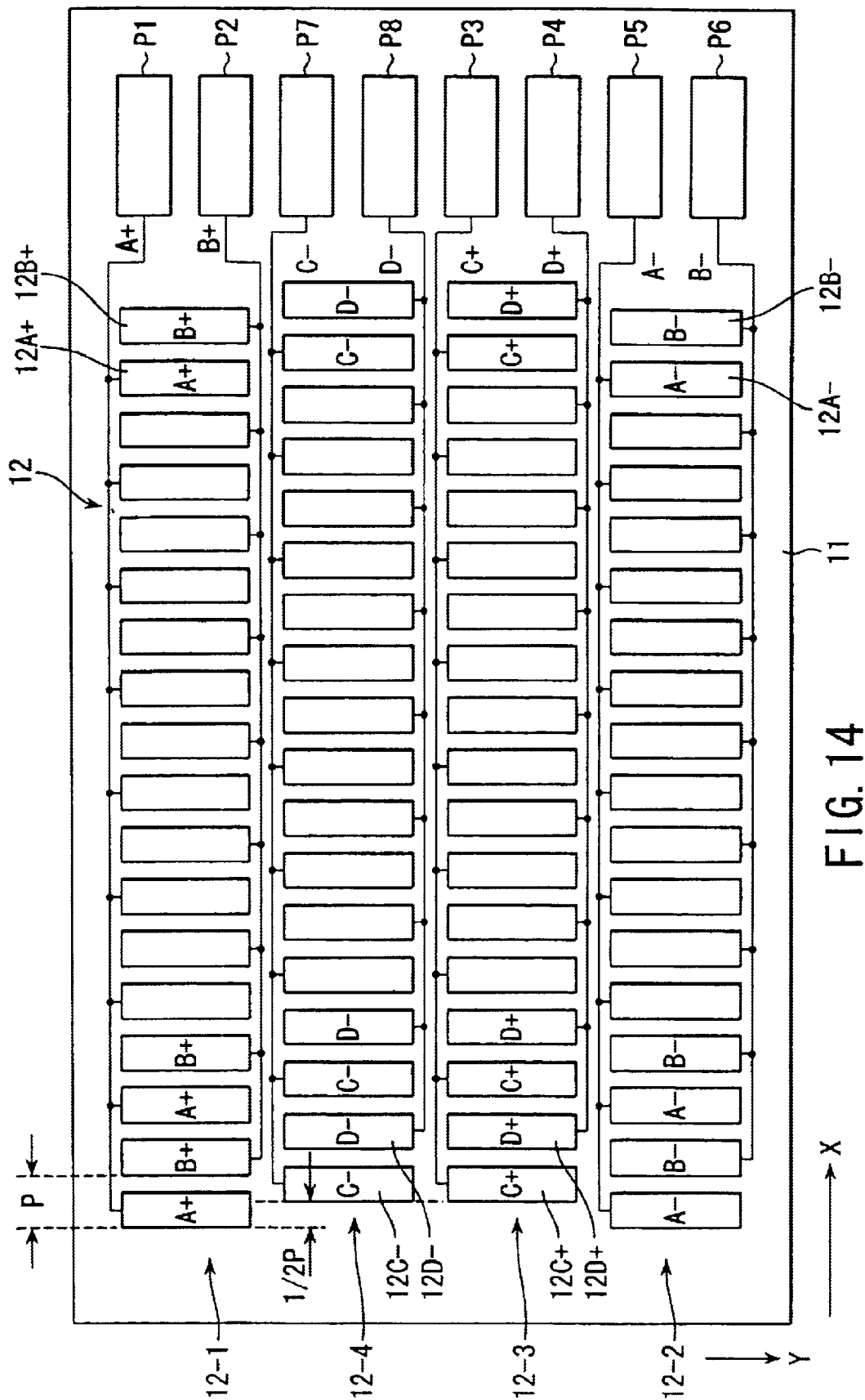
FIG. 14 is a plan view schematically showing the construction of the first electrode array on the first stator section included in an electrostatic actuator according to a fourth embodiment of the present invention.

FIG. 14 is a plan view showing the first electrode array 12 of the first stator section 1 included in the electrostatic actuator according to a fourth embodiment of the present invention. As shown in the drawing, the first electrode array 12 includes a first electrode group 12-1 consisting of the electrodes 12A+ and 12B+, a second electrode group 12-2 consisting of the electrodes 12A− and 12B−, a third electrode group 12-3 consisting of the electrodes 12C+ and 12D+ and a fourth electrode group 12-4 consisting of the electrodes 12C−and 12D−. These electrode groups 12-1, 12-4, 12-3 and 12-2 are arranged in the order mentioned.

The electrodes of the electrode groups 12-1 and 12-2 have an electrically paired relationship and are arranged to extend in the X-direction at the same pitch P and under the same phase. Likewise, the electrodes of the electrode groups 12-3 and 12-4 have an electrically paired relationship and are arranged to extend in the X-direction at the same pitch P and under the same phase. However, the phase of the electrodes of the electrode groups 12-3 and 12-4 is deviated by ½ pitch (P/2) from the phase of the electrodes of the electrode groups 12-1 and 12-2.

On the other hand, the second electrode array 22 on the second stator section 2 consists of two band-like electrodes 22M and 22N formed on the substrate 21 a predetermined distance apart from each other and extending in the longitudinal direction (X-direction) of the substrate 21. Further, the fifth electrode 33 is formed in four rows on the movable section 3 in a manner to correspond to the electrode groups 12-1, 12-2, 12-3, 12-4 of the first electrode array 12.

The electrode 12A+, the electrode 12B+, the electrode 12C+, the electrode 12D+, the electrode 12A−, the electrode 12B−, the electrode 12C− and the electrode 12D− correspond to the electrodes 12A, 12B, 12C and 12D in the first embodiment. The electrode imparted with the same symbols are commonly connected to the driving circuit through the pads P1, P2, P3, P4, P5, P6, P7 and P8.

In the first step of the fourth embodiment of the present invention, a positive voltage is applied to the electrode 12A+ and a negative voltage is applied to the electrode 12A− for a predetermined period so as to generate lines of electric force running through the electrode 12A+, the fifth electrode 33 and the electrode 12A−. Since the lines of electric force thus generated tend to shrink as much as possible, an electrostatic attractive force is generated between the electrode 12A+, 12A− and the fifth electrode 33, with the result that the movable section 3 is moved toward the first stator section 1. Then, a positive voltage is applied to the electrode M22 and a negative voltage is applied to the electrode N22 so as to generate lines of electric force running through the electrode 22M, the sixth electrode 34 and the electrode N22. Since the lines of electric force thus generated tend to shrink as much as possible, an electrostatic force is generated between the electrodes M22, N22 and the sixth electrode 34, with the result that the movable section 3 is moved toward the second stator section 2.

In the next step, a positive voltage is applied to the electrode 12C+ and a negative voltage is applied to the electrode 12C– for a predetermined period so as to generate an electrostatic attractive force between the electrodes 12C+, 12C– and the fifth electrode 33, with the result that the movable section 3 is moved toward the first stator section 1. Then, a negative voltage is applied to the electrode 22M and a positive voltage is applied to the electrode 22N so as to generate an electrostatic attractive force between the electrodes 22M, 22N and the sixth electrode 34, with the result that the movable section 3 is moved toward the second stator section 2. It should be noted that the positions of the electrodes 12C+ and 12C– of the first electrode array 12 to which the voltages are applied are deviated by ½ pitch (P/2) from the positions of the electrodes 12A+ and 12A– to which the voltages were applied previously, with the result that the movable section 3 is moved by P/2 to the right when moved toward the second stator section 2.

Likewise, a positive voltage is applied to the electrode 12B+ and a negative voltage is applied to the electrode 12B– for a predetermined period so as to generate an electrostatic attractive force between the electrodes 12B+, 12B– and the fifth electrode 33, with the result that the movable section 3 is moved toward the first stator section 1. Then, a positive voltage is applied to the electrode 22M and a negative voltage is applied to the electrode 22N so as to generate an electrostatic attractive force between the electrodes 22M, 22N and the sixth electrode 34, with the result that the movable section 3 is moved toward the second stator section 2. Further, a positive voltage is applied to the electrode 12D+ and a negative voltage is applied to the electrode 12D– for a predetermined period so as to generate an electrostatic attractive force between the electrodes 12D+, 12D– and the fifth electrode 33, with the result that the movable section 3 is moved toward the first stator section 1. Then, a negative voltage is applied to the electrode 22M and a positive voltage is applied to the electrode 22N so as to generate an electrostatic attractive force between the electrodes 22M, 22N and the sixth electrode 34, with the result that the movable section 3 is moved toward the second stator section 2.

By the driving operation described above, the movable section 3 is macroscopically moved to the right while being vibrated microscopically between the first stator section 1 and the second stator section 2, as in the first embodiment. If the order of applying the DC voltage to the electrodes is made opposite to that described above, the movable section 3 can be moved to the left in FIG. 14.

The fourth embodiment described above produces the effects similar to those produced by the first embodiment described previously. Also, in the first embodiment, the movement resolution of the movable section 3 (i.e., the moving distance per step) is equal to the electrode arranging pitch P of the first electrode array 12. In the fourth embodiment, however, the movement resolution of the movable section 3 is half the electrode arranging pitch P of the first electrode array 12 so as to make it possible to achieve the movement of a higher accuracy.

It should also be noted that, in the fourth embodiment of the present invention, the connection between the electrode and the pad can be achieved by a planar wiring in place of a steric wiring so as to improve the mass production capability of the electrostatic actuator.

(Fifth Embodiment)

Figure 15:
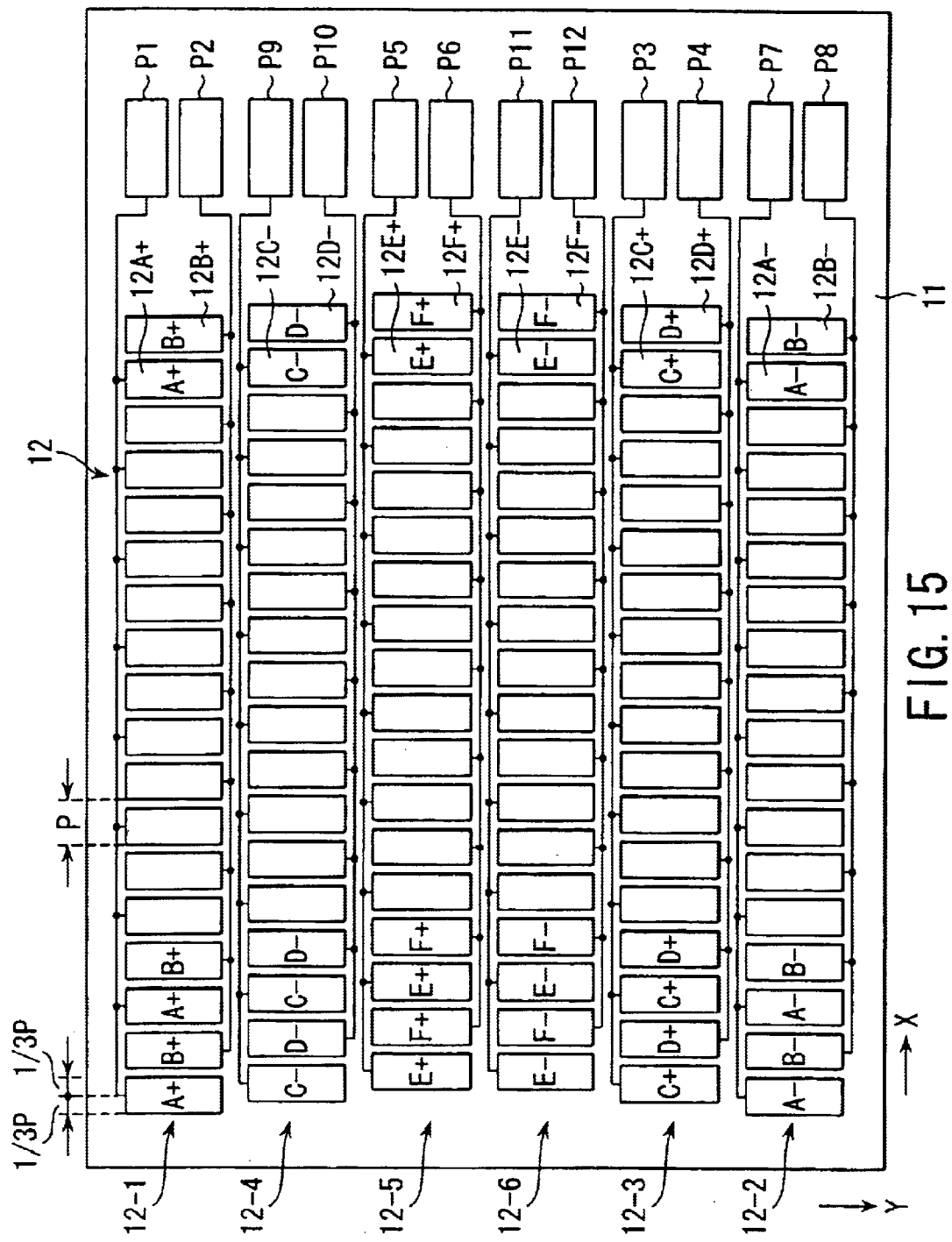
FIG. 15 is a plan view schematically showing the construction of the first electrode array on the first stator section included in an electrostatic actuator according to a fifth embodiment of the present invention.

FIG. 15 is a plan view showing the first electrode array 12 on the first stator section 1 included in an electrostatic actuator according to a fifth embodiment of the present invention. In the fifth embodiment of the present invention, two electrode groups are further added to the first electrode array 12 used in the fourth embodiment of the present invention. To be more specific, the first electrode array 12 in the fifth embodiment includes a first electrode group 12-1 consisting of the electrodes 12A+ and 12B+, a second electrode group 12-2 consisting of the electrodes 12A– and 12B–, a third electrode group 12-3 consisting of the electrodes 12C+ and 12D+, a fourth electrode group 12-4 consisting of the electrodes 12C– and 12D–, a fifth electrode group 12-5 consisting of the electrodes 12E+ and 12F+, and a sixth electrode group 12-6 consisting of the electrodes 12E– and 12F–,. These electrode groups 12-1, 12-2, 12-3, 12-4, 12-5 and 12-6 are arranged in the order mentioned.

The electrodes of the electrode groups 12-1 and 12-2 have an electrically paired relationship and are arranged to extend in the X-direction at the same pitch P and under the same phase. Likewise, the electrodes of the electrode groups 12-3 and 12-4 have an electrically paired relationship and are arranged to extend in the X-direction at the same pitch P and under the same phase. Further, the electrodes of the electrode groups 12-5 and 12-6 have an electrically paired relationship and are arranged to extend in the X-direction at the same pitch P and under the same phase. However, the phase of the electrodes of the electrode groups 12-5 and 12-6 is deviated by ⅓ pitch (P/3) from the phase of the electrodes of the electrode groups 12-3 and 12-4 and, thus, is deviated by ½ pitch (2P/3) from the phase of the electrodes of the electrode groups 12-1 and 12-2.

On the other hand, the second electrode array 22 on the second stator section 2 consists of two band-like electrodes 22M and 22N formed on the substrate 21 a predetermined distance apart from each other and extending in the longitudinal direction (first direction) of the substrate 21. Further, the third electrode 34 is formed in six rows on the movable section 3 in a manner to correspond to the electrode groups 12-1, 12-2, 12-3, 12-4, 12-5 and 12-6 of the first electrode array 12.

The electrodes 12A+, 12B+, 12C+, 12D+, 12E+, 12F+, 12A–, 12B–, 12C–, 12D–, 12E– and 12F– are commonly connected to the driving circuit (not shown) through pads P1 to P12, respectively.

In the first step of the fifth embodiment of the present invention, a positive voltage is applied to the electrode 12A+ and a negative voltage is applied to the electrode 12A– for a predetermined period so as to generate lines of electric force running through the electrode 12A+, the fifth electrode 33 and the electrode 12A– so as to generate an electrostatic attractive force between the electrode 12A+, 12A– and the fifth electrode 33, with the result that the movable section 3 is moved toward the first stator section 1. Then, a positive voltage is applied to the electrode M22 and a negative voltage is applied to the electrode N22 so as to generate an electrostatic force between the electrodes M22, N22 and the sixth electrode 34, with the result that the movable section 3 is moved toward the second stator section 2.

In the next step, a positive voltage is applied to the electrode 12C+ and a negative voltage is applied to the electrode 12C– for a predetermined period so as to generate an electrostatic attractive force between the electrodes 12C+, 12C− and the fifth electrode 33, with the result that the movable section 3 is moved toward the first stator section 1. Then, a negative voltage is applied to the electrode 22M and a positive voltage is applied to the electrode 22N so as to generate an electrostatic attractive force between the electrodes 22M, 22N and the sixth electrode 34, with the result that the movable section 3 is moved toward the second stator section 2.

In the next step, a positive voltage is applied to the electrode 12F+ and a negative voltage is applied to the electrode 12F− for a predetermined period so as to generate an electrostatic attractive force between the electrodes 12C+, 12C− and the fifth electrode 33, with the result that the movable section 3 is moved toward the first stator section 1. Then, a negative voltage is applied to the electrode 22M and a positive voltage is applied to the electrode 22N so as to generate an electrostatic attractive force between the electrodes 22M, 22N and the sixth electrode 34, with the result that the movable section 3 is moved toward the second stator section 2.

By the driving operation described above, the movable section 3 is macroscopically moved to the right while being vibrated microscopically between the first stator section 1 and the second stator section 2, as in the first embodiment. If the order of applying the DC voltage to the electrodes is made opposite to that described above, the movable section 3 can be moved to the left in FIG. 15.

The fifth embodiment described above produces the effects similar to those produced by the first embodiment described previously. Also, in the fourth first embodiment, the movement resolution of the movable section 3 is one third of the electrode arranging pitch P of the first electrode array 12 so as to make it possible to achieve the movable section movement of a higher accuracy. The technical idea of the fifth embodiment readily suggests that it is possible for the first electrode array to be formed of a larger number of electrode groups. If the first electrode array is formed of an n-number of electrode groups, n being an even number, which are arranged side by side in a manner to extend in the longitudinal direction of the first stator section 1, the movement resolution of the movable section 3 can be further increased by deviating the phase of each of the electrodes of the electrode groups by 1/(n/2) of the electrode arranging pitch.

The fifth embodiment of the present invention is equal to the fourth embodiment in that a steric wiring is not required so as to make it possible to improve the mass production capability of the electrostatic actuator.

(Sixth Embodiment)

FIGS. 12A and 12B show the first electrode array 12 on the first stator section 1 and the second electrode array 22 on the second stator section 22, respectively, according to a sixth embodiment of the present invention. As shown in FIG. 16A, the first electrode array 12 includes a first electrode group 12-1 consisting of electrodes 12A+ and 12B+ each arranged at a pitch P in a manner to extend in the X-direction and a second electrode group 12-2 consisting of electrodes 12A− and 12B− each arranged at a pitch P in a manner to extend in the X-direction. On the other hand, the second electrode array 22 includes a first electrode group 22-1 consisting of electrodes 12C+ and 12D+ each arranged at a pitch P in a manner to extend in the X-direction and a second electrode group 22-2 consisting of electrodes 12C− and 12D− each arranged at a pitch P in a manner to extend in the X-direction. It should be noted, however, that the phase of the electrodes of the second electrode array 22 is deviated by ½ pitch (P/2) from the phase of the electrodes of the first electrode array 12.

The electrodes 12A+, the electrodes 12B+, the electrodes 12A− and the electrodes 12B− are commonly connected to the driving circuit (not shown) through the pads P1, P2, P3 and P4, respectivelsy. Likewise, the electrode 12C+, the electrode 12D+, the electrode 12C− and the electrode 12D− belong to the groups of the electrode 12C+, the electrode 12D+, the electrode 12C−and the electrode 12D−, respectively, and are commonly connected for each group to the driving circuit (not shown) through the pads P5, P6, P7 and P8.

The operation of the electrostatic actuator according to the sixth embodiment of the present invention will now be described with reference to FIGS. 17A to 17H. Specifically, FIGS. 17A to 13H show the wave forms of the voltages applied to electrode 12A+, the electrode 12A−, the electrode 12B+, the electrode 12B−, the electrode 12C+, the electrode 12C−, the electrode 12D+, the electrode 12D−, respectively.

Figure 17:
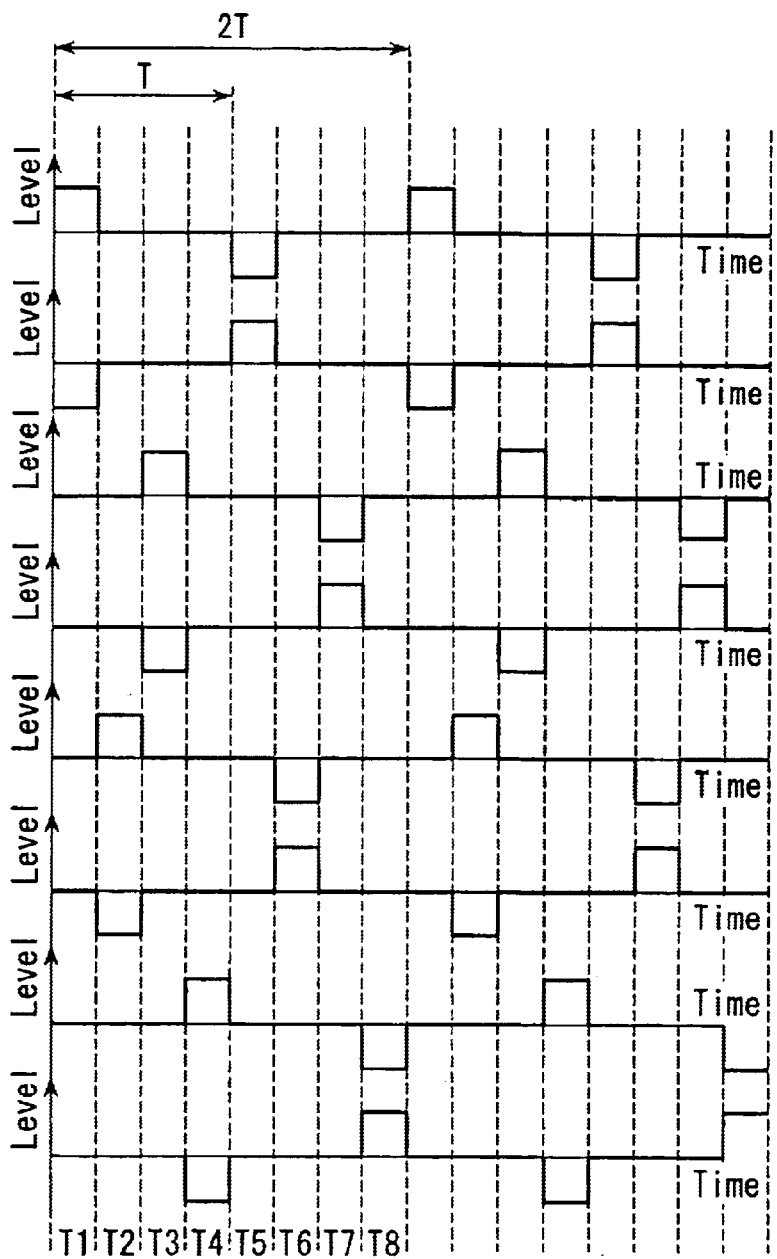
FIGS. 17A to 17H are timing charts for describing the operation of the electrostatic actuator shown in FIG. 16.

In the first step, a positive voltage is applied to the electrode 12A+ on the first stator section 1 and a negative voltage is applied to the electrode 12A− on the first stator section 1 during a period T1 as shown in FIGS. 17A and 17B. In this stage, the circuit consisting of the electrode 12A+, the fifth electrode 33 and the electrode 12A− equivalently corresponds to a series circuit including two capacitors so as to generate lines of electric force running through the electrode 12A+, the fifth electrode 33 and the electrode 12A−. Since the lines of electric force thus generated tend to shrink as much as possible, an electrostatic attractive force is generated between the electrodes 12A+, 12A− and the fifth electrode 33, with the result that the movable section 3 is moved toward the first stator section 1.

Then, a positive voltage is applied to the electrode 12C+ on the second stator section 2 and a negative voltage is applied to the electrode 12C− on the second stator section 2 during a period T2 as shown in FIGS. 17E and 17F. In this stage, the circuit consisting of the electrode 12C+, the sixth electrode 34 and the electrode 12C− equivalently corresponds to a series circuit including two capacitors so as to generate lines of electric force running through the electrode 12C+, the sixth electrode 34 and the electrode 12C−. Since the lines of electric force thus generated tend to shrink as much as possible, an electrostatic attractive force is generated between the electrodes 12C+, 12C− and the fifth electrode 33, with the result that the movable section 3 is moved toward the second stator section 2. It should be noted that the phase of the electrodes 12C+, 12C− is deviated by P/2 from the phase of the electrodes 12A+, 12A−, with the result that the movable section 3 is moved to the right in FIG. 16 by P/2 when moved to the second stator section 2.

In the next step, a positive voltage is applied to the electrode 12B+ on the first stator section 1 and a negative voltage is applied to the electrode 12B− on the first stator section 1 during a period T3 as shown in FIGS. 17C and 17D. In this stage, lines of electric force are generated in a manner to run through the electrode 12B+, the fifth electrode 33 and the electrode 12B−. As a result, an electrostatic attractive force is generated between the electrodes 12B+, 12B− and the fifth electrode 33, with the result that the movable section 3 is moved toward the first stator section 1. It should be noted that the phase of the electrodes 12B+, 12B− is deviated by P/2 from the phase of the electrodes 12A+, 12A−, with the result that the movable section 3 is moved to the right in FIG. 16 by P/2 when moved to the first stator section 1.

Then, a positive voltage is applied to the electrode 12D+ on the second stator section 2 and a negative voltage is applied to the electrode 12D− on the second stator section 2 during a period T4 as shown in FIGS. 17G and 17H. As a result, lines of electric force are generated to run through the electrode 12D+, the sixth electrode 34 and the electrode 12D−, and an electrostatic attractive force is generated between the electrodes 12D+, 12D− and the sixth electrode 34, with the result that the movable section 3 is moved toward the second stator section 2. It should be noted that the phase of the electrodes 12D+, 12D− is deviated by P/2 from the phase of the electrodes 12C+, 12C−, with the result that the movable section 3 is moved to the right in FIG. 16 by P/2 when moved to the second stator section 2.

Figure 16:
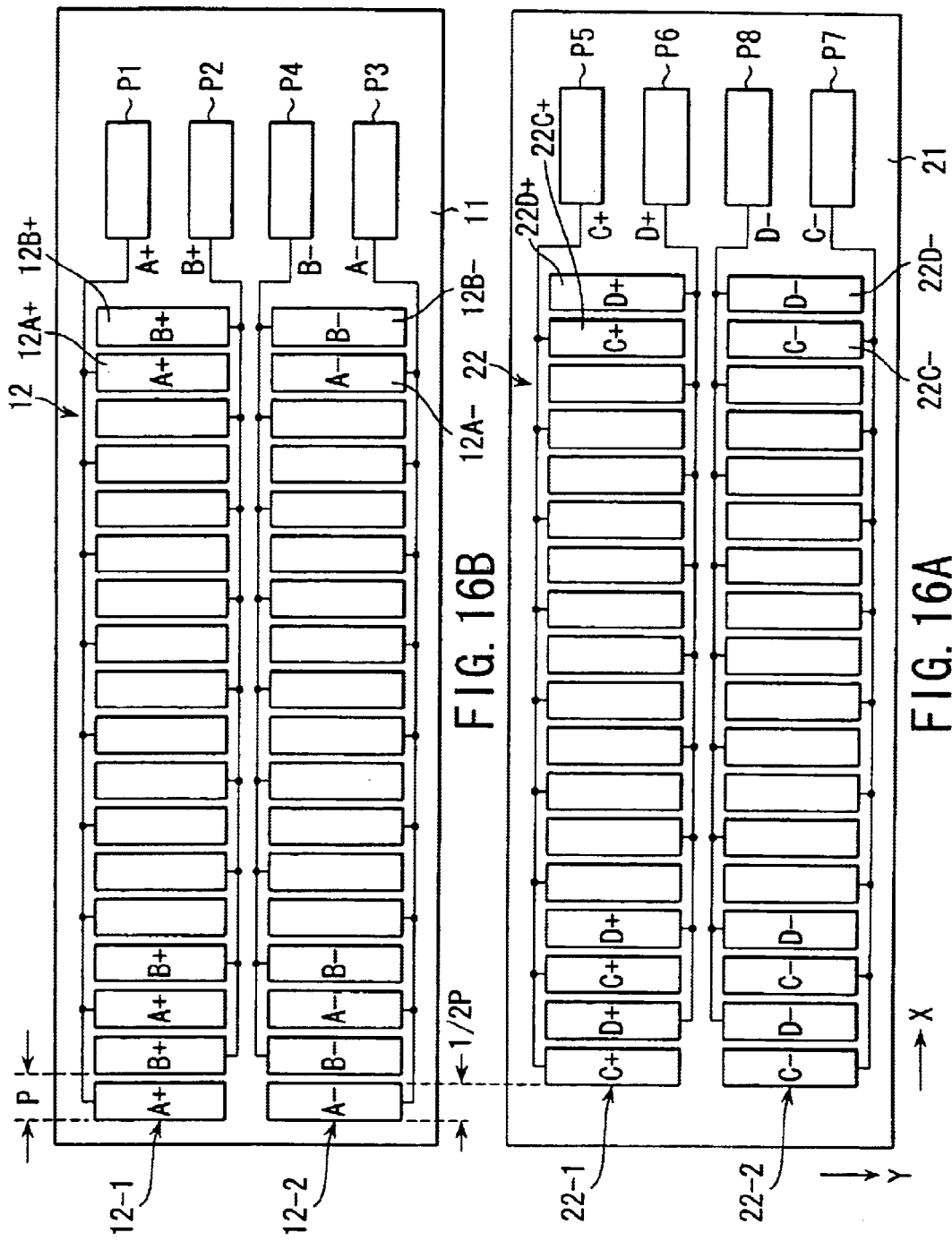
FIGS. 16A and 16B are a plan view schematically showing the construction of the first and second electrode arrays on the first and second stator sections included in an electrostatic actuator according to a sixth embodiment of the present invention.

By the driving operation described above, the movable section is macroscopically moved to the right in FIG. 16 while being vibrated microscopically between the first stator section and the second stator section. The movable section 3 can be moved to the left in FIG. 16 by making opposite the order of applying a DV voltage to the electrodes.

Likewise, a DC voltage is applied successively to the electrode 12A+, the electrode 12A−, the electrode 12B+, the electrode 12B−, the electrode 12C+, the electrode 12C−, the electrode 12D+ and the electrode 12D− during periods T4 to T8, and the driving operation of one period T is finished by the periods T1 to T8. It should be noted in this connection that the polarity of the DC voltage applied during the periods T5 to T8 is opposite to that of the DC voltage applied during the periods T1 to T4, as apparent from FIGS. 17A to 17H, with the result that the charge produced by the dielectric polarization of the dielectric films 13, 23 is canceled as in the embodiments described previously. It follows that the moving operation of the movable section 3 is prevented from being rendered unstable by the dielectric polarization.

(Seventh Embodiment)

Figure 18:
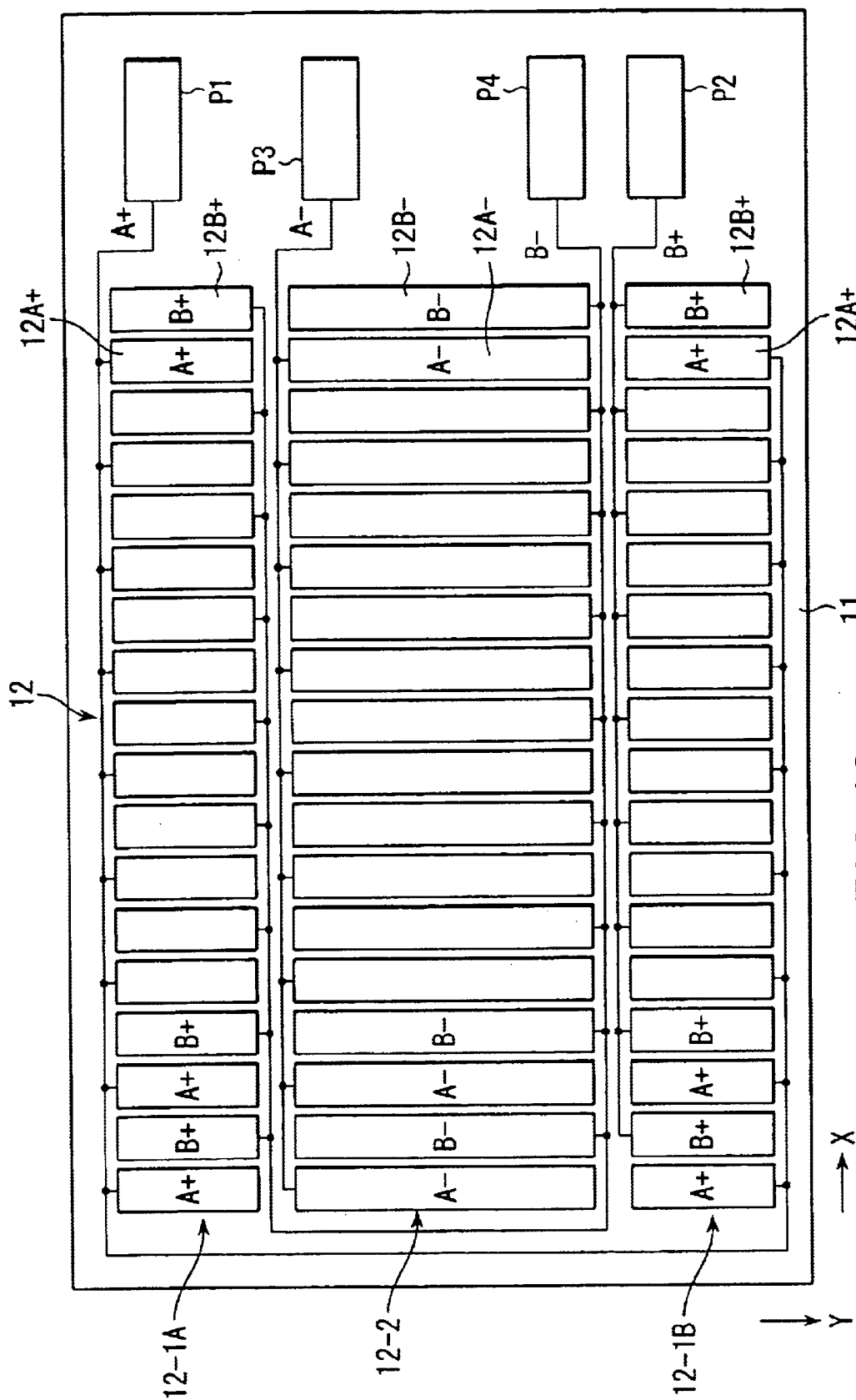
FIG. 18 is a plan view schematically showing the construction of the first electrode array on the first stator section included in an electrostatic actuator according to a seventh embodiment of the present invention.

FIG. 18 is a plan view showing the first electrode array 12 on the first stator section 1 according to a seventh embodiment of the present invention. The seventh embodiment of the present invention differs from the sixth embodiment in that the first electrode group 12-1 in the sixth embodiment consisting of the electrodes 12A+ and 12B+ is divided into electrode groups 12-1A and 12-B, and these electrode groups 12-1A and 12-B are arranged on both sides of the second electrode group 12-2 consisting of the electrodes 12A− and 12B−. The electrodes belonging to the same group of the divided electrode groups 12-1A and 12-1B are commonly connected by wirings, and these divided electrode groups 12-1A and 12-B collectively perform the function of a single electrode group.

On the other hand, the phase of the electrodes of the second electrode array (not shown) on the second stator section 2 is deviated by ½ pitch from the phase of the electrodes of the first electrode array as in the sixth embodiment. The driving operation of the seventh embodiment is equal to that of the sixth embodiment and, thus, the description is omitted in respect of the driving operation of the seventh embodiment.

The seventh embodiment produces the effects similar to those produced by the first to sixth embodiments described previously and an additional effect as described in the following. Specifically, in each of the first to sixth embodiments, the point at which the electrostatic attractive force produced between the first stator section 1 or the second stator section 2 and the movable section 3 is rendered maximum is positioned in the center in the Y-direction, with the result that it is possible for the movable section 3 to be swung to the right or left about the center in the Y-direction. In the seventh embodiment, however, the point where the electrostatic attractive force is rendered maximum is positioned in two points deviant to the right and the left from the center in the Y-direction, with the result that the movable section 3 is unlikely to be swung. In conclusion, the seventh embodiment is advantageous over the first to seventh embodiments in that it is possible to stabilize the behavior and the posture of the movable section 3.

(Eighth Embodiment)

Figure 19:
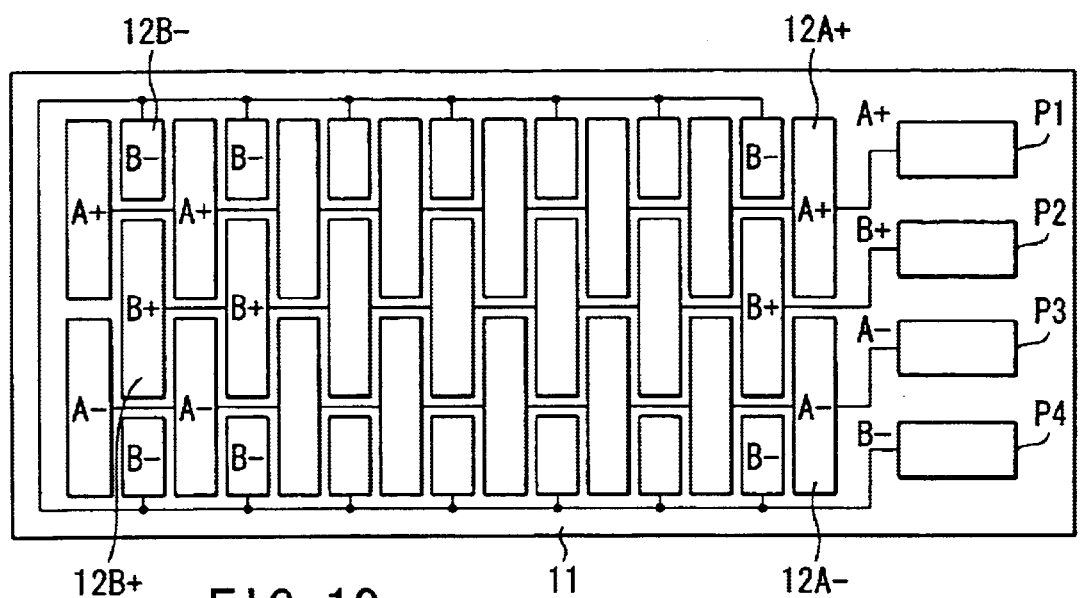
FIG. 19 is a plan view schematically showing the construction of the first electrode array on the first stator section included in an electrostatic actuator according to a eighth embodiment of the present invention.

FIG. 19 is a plan view showing the first electrode array 12 on the first stator section 1 according to a eighth embodiment of the present invention. The eighth embodiment differs from the sixth embodiment in that the electrode 12B+ in the sixth embodiment is divided in the second direction (Y-direction) into three electrodes, and the divided electrodes 12B− are arranged between the adjacent electrodes 12A+. These divided electrodes 12B− are commonly connected by a wiring and collectively perform the function of a single electrode group.

On the other hand, the phase of the electrodes of the second electrode array (not shown) on the second stator section 2 is deviated by ½ pitch from the phase of the electrodes of the first electrode array as in the sixth embodiment. The driving operation of the eighth embodiment is equal to that of the sixth embodiment and, thus, the description is omitted in respect of the driving operation of the eighth embodiment.

The eighth embodiment produces the effects similar to those produced by the seventh embodiment and an additional effect as described in the following. Specifically, it is possible to improve the wiring efficiency of the electrodes 12A+ and the electrodes 12B+ as apparent from FIG. 19. It follows that the eighth embodiment is advantageous in that, if the area of the substrate 11 is the same, it is possible to increase the effective area of the electrode, leading to an improved driving capability of the movable section 3.

(Ninth Embodiment)

Figure 20:
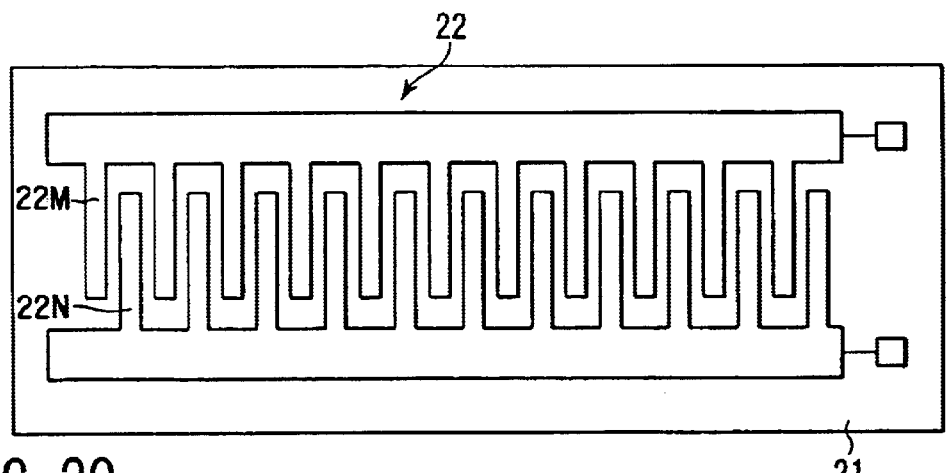
FIG. 20 is a plan view schematically showing the construction of the first electrode array on the first stator section included in an electrostatic actuator according to an ninth embodiment of the present invention.

FIG. 20 is a plan view showing the construction of the second electrode array 22 on the second stator section 2 according to an ninth embodiment of the present invention. As shown in the drawing, the second electrode array 22 includes the electrodes 22M and 22N as in the first embodiment. What should be noted is that each of these electrodes 22M and 22N is in the shape of comb teeth, and the teeth of these electrodes 22M and 22N are meshed with each other in a con-contact fashion. The second electrode array 22 of the particular construction produces the effect similar to that produced by the second electrode array 22 used in the first embodiment.

(Tenth Embodiment)

An application of the electrostatic actuator of the present invention will now be described. The electrostatic actuator of the present invention permits producing efficient driving characteristics with a small power consumption and, thus, is adapted for use as, for example, the focus adjusting mechanism of a small electronic camera.

Figure 21:
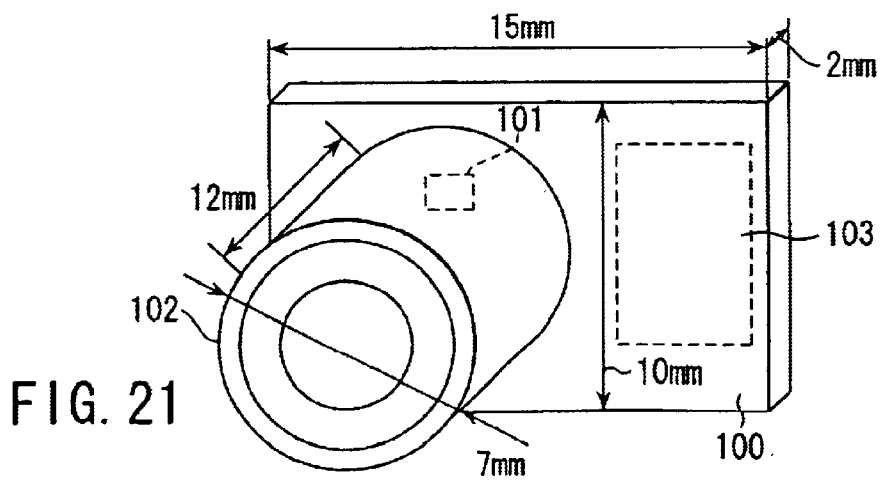
FIG. 21 is a plan view showing a small electronic camera module according to a tenth embodiment of the present invention, which is a modification of the electrostatic actuator of the present invention.

FIG. 21 shows the module portion of a small electronic camera using the electrostatic actuator according to the ninth embodiment of the present invention in the focus adjusting mechanism. As shown in the drawing, a solid state image pick-up element 101 formed of a CMOS or a CCD is arranged on a substrate 100, and an electrostatic actuator 102 is mounted to the solid state image pick-up element 101. In the electrostatic actuator 102, a lens 5 is integrally mounted to the movable section 3 as shown in FIG. 1. Also, the driving circuit 4 of the electrostatic actuator 102 and an IC chip 103 including, for example, a DSP (digital signal processor) chip for controlling the driving circuit 4 are mounted to the substrate 100.

The electronic camera module can be formed very small as shown in FIG. 21 and is adapted for use in, for example, a portable telephone and a digital camera.

Additional advantages and modifications will readily occur to those skilled in the art. Therefore, the present invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A camera module for photographing a picture image, comprising:
    an electrostatic actuator, including:
        a first stator section including a first electrode array including first, second and third electrodes arranged at a predetermined pitch in a first direction,
        a second stator section arranged to face the first stator section and to define a space between the first and second stator sections, the second stator section including a second electrode array including forth and fifth electrodes;
        a movable section arranged in the space and including a first electrode section electrode array, the first and second electrode sections being maintained at a predetermined potential, and
        a driving circuit configured to apply at least first, second, third and forth DC voltage signals to the first and second arrays, alternatively, each DC voltage signal having a first level higher than the predetermined potential and a second level lower than the predetermined potential, wherein
            the first DC voltage signal being applied to the adjacent first and second electrodes of the first electrode array to attract the first electrode section of the movable section during a first period, the first and second electrodes of the first electrode array being maintained at the first and second levels during the first period, respectively,
            the second DC voltage signal being applied to the fourth and fifth electrodes of the second electrode array to attract the second electrode section of the movable section during a second period, the forth electrode of the second electrode array being maintained at one of the first and second levels during the second period, and the fifth electrode of the second electrode array being maintained at the other of first and second levels during the second period, respectively,
            the third DC voltage signal being applied to the adjacent second and third electrodes of the first electrode array to attract the first electrode section of the movable section during a third period, the second and third electrodes of the first electrode array being maintained at the first and second levels during the third period, respectively,
            the fourth DC voltage signal being applied to the fourth and fifth electrodes of the second electrode array to attract the second electrode section of the movable section during a fourth period, the fourth electrode of the second electrode array being maintained at one of the first and second levels during the fourth period, and the fifth electrode of the second electrode array being maintained at the other of first and second levels during the fourth period, and
            the movable section being moved in the first direction in accordance with the application of the first, second, third and fourth DC voltage signals.

2. The camera module according to claim 1, wherein
    the first electrode array further includes sixth electrodes, and
    the driving circuit applies to fifth DC voltage signal to the adjacent third and sixth electrodes of the first electrode array to attract the first electrode section of the movable section during a fifth period, the third and sixth electrodes of the first electrode array being maintained at the first and second levels during the fifth period, respectively.

3. The camera module according to claim 1, wherein
    the movable section has concave and convex portions faced to the first electrode array, the first electrode section of the movable section being formed on the convex portion.

4. A camera module for photographing a picture image, comprising:
    an electrostatic actuator, including:
        a fist stator including a first electrode array including first, second and third electrodes arranged at a predetermined pitch in a first direction,
        a second stator section arranged to face the first stator section and to define a space between the first and second stator sections, and including a second electrode array including fourth, fifth and sixth electrodes arranged at the predetermined pitch in the first direction,
        a movable section arranged in the space and including a first electrode section facing the first electrode array and a second electrode section facing the second electrode array, the first and second electrode sections being maintained at a predetermined potential, and
        a driving circuit configured to apply at least first, second, third, and fourth DC voltage signals to the first and second electrode arrays, alternatively, each DC voltage signal having the first level higher than the predetermined potential and a second level lower than the predetermined potential, wherein
            the first DC voltage signal being applied to the adjacent first and second electrodes of the first electrode array to attract the first electrode section of the movable section during a first period, the first and second electrodes of the first electrode array being maintained at the first and second levels during the first period, respectively,
            the second DC voltage signal being applied to the adjacent fourth and fifth electrodes of the second electrode array to attract and the second electrode section of the movable section during a second period, the fourth and fifth electrodes of the second electrode array being maintained at the first and second levels during the second period, respectively,
            the third DC voltage being applied to the adjacent second and third electrodes of the first electrode array to attract the first electrode section of the movable section during a third period, the second and third electrodes of the first electrode array being maintained at the first and second levels during the third period, respectively, the fourth DC voltage signal being applied to the adjacent fifth and sixth electrodes of the second electrode array to attract the second electrode section of the movable section during a fourth period, the fifth and sixth electrodes of the second electrode array being maintained at the first and second levels during the fourth period, respectively, and the movable section being moved in the first direction in accordance with the application of the first, second, third and fourth DC voltage signals.

5. The camera module according to claim 4, wherein the second electrode array arranged at the same pitch as that of the first electrode array in the first direction is further arranged so that the arrangement of the second electrode array is deviated by half the predetermined pitch from the arrangement of the first electrode array.

6. The electrostatic actuator according to claim 4, wherein the first electrode array further includes seventh electrodes, the second electrode array further includes eighth electrodes, the driving circuit applies a fifth DC voltage signal to the adjacent third and seventh electrodes of the first electrodes array to attract the first electrode section of the movable section during a fifth period, the third and seventh electrodes of the first electrode array being maintained at the first and second levels during the fifth period, respectively, and the driving circuit applies a sixth DC voltage signal to the fourth and eighth electrodes of the second electrode array to attract the second electrode section of the movable section during a sixth period, the fourth and eighth electrodes of the second electrode array being maintained at the first and second levels during the sixth period, respectively.

7. The camera module according to claim 6, wherein the second electrode array arranged at the same pitch as that of the first electrode array in the first direction is further arranged so that the arrangement of the second electrode array is deviated by half the predetermined pitch from the arrangement of the first electrode array.

8. The camera module according to claim 4, wherein the movable section has concave and convex portions faced to the first electrode array, the first electrode section of the movable section being formed on the convex portion.

9. A camera module for photographing a picture image, comprising:

an electrostatic actuator, including,
a first stator section including first and second electrode arrays each including first, second and third electrodes and arranged substantially in parallel and at a predetermined pitch in a first direction,
a second stator section arranged to face the first stator section and to define space between the first and second stator sections, and including a third electrode array including fourth and fifth electrodes,
a movable section arranged in the space and including a first electrode section facing the first and second electrode arrays and a second electrode section facing the third electrode array, the first and second electrode sections being maintained at a predetermined potential, and
a driving circuit configured to apply at least first, second, and third DC voltage signals to the first, second and third electrode arrays, alternatively, each DC voltage signal having a first level higher than the predetermined potential and a second level lower than the predetermined potential, the first DC voltage signal being applied to the first and second electrodes of the first and second electrode arrays to attract the first electrode section of the movable section during a first period, the first and second electrodes of the first and second electrode arrays being maintained at the first and second levels during the first period, respectively, the second DC voltage signal being applied to the fourth and fifth electrodes of the third electrode array to attract the second electrode section of the movable section during a second period, the third DC voltage signal being applied to the second and third electrodes of the first and second electrode arrays to attract the first electrode section of the movable section during a third period, the second and third electrodes of the first and second electrode arrays being maintained at the first and second levels during the third period, respectively, and the movable section being moved in the first direction in accordance with the application of the first, second and third DC voltage signals.

10. The camera module according to claim 9, wherein the fourth and fifth electrodes of the third electrode array extend in the first direction.

11. The camera module according to claim 10, wherein the first and second electrode arrays further include sixth electrodes, the driving circuit applies a fourth DC voltage signal to the fourth and fifth electrodes of the third electrode array to attract the second electrode section of the movable section during a fourth period, and the driving circuit applies a fifth DC voltage signal to the third and the sixth electrodes of the first and second electrode arrays to attract the second electrode section of the movable section during a fifth period, the third and sixth electrodes of the first and second electrode arrays being maintained at the first and second levels during the fifth period, respectively.

12. A camera module for photographing a picture image, comprising:

an electrostatic actuator, the electrostatic actuator including,
a first stator section including first and second electrode arrays each including first and second electrodes arranged substantially in parallel and at a predetermined pitch in a first direction,
a second stator section arranged to face the first section and to define a space between the first and second stator sections, and including third and fourth electrodes arrays each including third and fourth electrodes arranged substantially in parallel and at the predetermined pitch in the first direction, the third and fourth electrodes of the third and fourth array having an arrangement deviated by half of the predetermined pitch from the arrangement of the first and second electrodes of the first and second electrode arrays,
a movable section arranged in the space and including a first electrode section facing the first and second electrode arrays and a second electrode section facing the third and fourth electrode arrays, the first and second electrode sections being maintained at a predetermined potential, and
a driving circuit configured to apply at least first, second, third, and fourth DC voltage signals to the first, second, third and fourth electrode arrays, alternatively, each DC voltage signal having a first level higher than the predetermined potential and a second level lower than the predetermined potential, wherein the first DC voltage signal being applied to the first electrodes of the first and second electrode arrays to attract the first electrode section of the movable section during a first period, the first electrodes of the first and second electrode arrays being maintained at the first and second levels during the first period, respectively, the second DC voltage signal being applied to the third electrodes of the third and fourth electrode arrays to attract the second electrode section of the movable section during a second period, the third electrodes of the third and fourth electrode arrays being maintained at the first and second levels during the second period, respectively, the third DC voltage signal being applied to the second electrodes of the first and second electrode arrays to attract the first electrode section of the movable section during a third period, the second electrodes of the first and second electrode arrays being maintained at the first and second levels during the third period, respectively, the fourth DC voltage signal being applied to the fourth electrodes of the third and fourth electrode arrays to attract the second electrode section of the movable section during a fourth period, the fourth electrodes of the third and fourth electrode arrays being maintained at the first and second levels during the fourth period, respectively, and the movable section being moved in the first direction in accordance with the application of the first, second, third and fourth DC voltage signals.

13. The camera module according to claim 11, wherein the first and second electrode arrays further include fifth electrodes, the third and fourth electrode arrays further include sixth electrodes, the driving circuit applies a fifth DC voltage signal to the fifth electrodes of the first and second electrode arrays to attract the first electrode section of the movable section during a fifth period, the fifth electrode of the first and second electrode arrays being maintained at the first and second levels during the fifth period, respectively, and the driving circuit applies a sixth DC voltage signal to the sixth electrodes of the third and fourth electrode arrays to attract the second electrode section of the movable section during a sixth period, the sixth electrodes of the third and fourth electrode arrays being maintained at the first and second levels during the sixth period, respectively.

14. A camera module for photographing a picture image, comprising:

a first stator section including first, second and third electrode arrays each including first, second and third electrodes and arranged substantially in parallel and at a predetermined pitch in a first direction;

a second stator section arranged to face the first stator section and to define a space between the first and second stator sections, and including a fourth electrode array including fourth and fifth electrodes;

a movable section arranged in the space and including a first electrode section facing the first, second and third electrode arrays and a second electrode section facing the fourth electrode array, the first and second electrode sections being maintained at a predetermined potential; and a driving circuit configured to apply at least first, second, and third DC voltage signals to the first, second, third and fourth electrode arrays, alternatively, the DC voltage signal having a first level higher than the predetermined potential and a second level lower than the predetermined potential, the first DC voltage signal being applied to the first and second electrodes of the first, second and third electrode arrays to attract the first electrode section of the moveable section during a first period, the first and second electrodes of the first and third electrode arrays being maintained at one of the first and second levels during the first period and the first and second electrodes of the second electrode array being maintained at the other of the first and second levels during the first period, the second DC voltage signal being applied to the fourth and fifth electrodes of the fourth electrode array to attract the second electrode section of the movable section during a second period, the third DC voltage signal being applied to the second and third electrodes of the first, second and third electrode arrays to attract the first electrode section of the movable section during a third period, the second and third electrodes of the first and third electrode arrays being maintained at one of the first and second levels during the third period, the second electrodes of the second electrode array being maintained at the other of the first and second levels during the third period, and the movable section being moved in the first direction in accordance with the application of the first, second and third DC voltage signals.

15. The camera module according to claim 14, wherein the fourth and fifth electrodes of the fourth electrode array extend in the first direction.

16. The camera module according to claim 15, wherein the movable section has concave and convex portions faced to the first stator section, the first electrode section of the movable section being formed on the convex portion.

* * * * *